(12) United States Patent
Hatano et al.

(10) Patent No.: US 7,792,007 B2
(45) Date of Patent: Sep. 7, 2010

(54) OPTICAL DEVICE FOR MONITOR AND OPTICAL PICKUP APPARATUS

(75) Inventors: Takuji Hatano, Suita (JP); Miyuki Teramoto, Osakasayama (JP); Hiroshi Hirayama, Musashino (JP); Masaru Okumura, Osaka (JP); Iwao Usui, Kawachinagano (JP)

(73) Assignee: Konica Minolta Opto, Inc., Tokyo (JP)

( * ) Notice: Subject to any disclaimer, the term of this patent is extended or adjusted under 35 U.S.C. 154(b) by 1317 days.

(21) Appl. No.: 11/183,552

(22) Filed: Jul. 18, 2005

(65) Prior Publication Data
US 2006/0028960 A1   Feb. 9, 2006

(30) Foreign Application Priority Data

Aug. 6, 2004   (JP) .............................. 2004-231297
Apr. 7, 2005   (JP) .............................. 2005-110751

(51) Int. Cl.
*G11B 7/135*   (2006.01)
*G11B 7/12*   (2006.01)

(52) U.S. Cl. ............ 369/112.29; 369/47.5; 369/112.01; 369/116

(58) Field of Classification Search ........................ None
See application file for complete search history.

(56) References Cited

U.S. PATENT DOCUMENTS

| | | | | |
|---|---|---|---|---|
| 5,235,587 A | * | 8/1993 | Bearden et al. | 369/109.02 |
| 5,420,848 A | * | 5/1995 | Date et al. | 369/53.25 |
| 5,563,870 A | * | 10/1996 | Silverstein | 369/112.01 |
| 5,740,150 A | * | 4/1998 | Uchimaru et al. | 369/119 |
| 6,463,023 B1 | | 10/2002 | Miura | |
| 6,876,621 B2 | * | 4/2005 | Ohuchida et al. | 369/112.09 |
| 2001/0014061 A1 | * | 8/2001 | Ueyanagi | 369/44.23 |
| 2001/0026523 A1 | * | 10/2001 | Ohuchida et al. | 369/112.07 |
| 2003/0218952 A1 | | 11/2003 | Katayama et al. | |

FOREIGN PATENT DOCUMENTS

| | | |
|---|---|---|
| JP | 08-279174 | 10/1996 |
| JP | 2004-046992 | 2/2004 |

\* cited by examiner

*Primary Examiner*—Joseph H Feild
*Assistant Examiner*—Christopher R. Lamb
(74) *Attorney, Agent, or Firm*—Brinks Hofer Gilson & Lione

(57) ABSTRACT

A monitor optical device has a first region and a second region. The first region transmits part of light beam emitted from a light source to introduce the transmitted light beam to a monitor device. The second region reflects the remainder of the light beam to introduce the reflected light beam to an optical disk. The first region is formed at least within the second region.

4 Claims, 21 Drawing Sheets

US 7,792,007 B2

OPTICAL DEVICE FOR MONITOR AND OPTICAL PICKUP APPARATUS

This application is based on the following Japanese Patent Applications No. 2004-231297 (filed in Japan Aug. 6, 2004) and Japanese Patent Application No. 2005-110751 (filed in Japan Apr. 7, 2005), the entire contents of which are hereby incorporated by references.

BACKGROUND OF THE INVENTION

1. Field of the Invention

The present invention relates to a monitor optical device for introducing part of light beam emitted from the light source to a detector for monitor and an optical pickup apparatus.

2. Description of the Related Art

In fields of the optical pickup and printer, often, auto power control (APC) has been adopted, in which laser beam emitted from a rear end face of a laser light source is monitored and the quantity (intensity) of the emitted light is controlled corresponding to its result in order to stabilize the quantity of emitted light of the laser light source. However, this method is difficult to control the quantity of light accurately by feedback because the quantity of light of laser beam emitted from both the front side and rear side of the laser light source are different. Further, because beam is emitted to an opposite side (rearward) to a predetermined direction (forward), the quantity of emitted light of the laser light source cannot be used effectively.

Thus, in recent years, front monitor type, in which laser beam emitted forward from the laser light source is branched partially at a predetermined position of a light recording optical system and the branched partial laser beam is used as monitor beam, has been often used.

As such a method, for example, (1) using part of emitted light as monitor beam by inserting a mirror in which reflectivity corresponding to wavelength is set in part of an optical path, (2) by reflecting light impinging on the surrounding of a prism or a mirror which multiplexes lights for CD, DVD or the like by several percentages, using it as monitor beam (see for example, U.S. Published application No. 2003/218952 A1, FIG. 1), and (3) by disposing diffraction grating in an optical path and branching light by diffraction using hologram, securing monitor beam (see, for example, Japanese Patent Application Laid-Open No. 8-279174).

According to the structure for picking out monitor light by disposing the light beam on an optical path as mentioned in (1), (3), the number of components is increased because such an optical device is needed. Particularly, in recent years, an apparatus in which a next generation optical disk meeting a blue laser and such optical disk as existing CD and DVD are available in the same optical system has been proposed. However, if the above-described methods (1) and (3) are applied to this kind of the apparatus, the monitor light needs to be picked out for each wavelength and thus, the aforementioned optical device is needed corresponding to each wavelength. As a result, the number of components increases, thereby inducing complexity of the apparatus and increase in manufacturing cost.

If in a mirror (particularly dielectric mirror) in which reflectivity corresponding to the wavelength is set up, the wavelength of laser beam impinging on the mirror deviates due to fluctuation at the time of manufacturing of a laser light source or changes in temperature, the quantity of reflected light on the mirror or the quantity of monitor beam changes accompanied by that. Therefore, if there is fluctuation of laser light source or changes in temperature, the method (1) is incapable of executing appropriate control on the quantity of light based on the monitor beam.

If the power (quantity of emitted light) of laser beam is changed or there is a change in temperature, the spreading (radiation angle) of laser beam emitted from the light source is changed. Thus, according to the method (2) using light impinging on the prism or the surrounding portion of the mirror as monitor light, the quantity of monitor beam is likely to change due to influences of change in power, so that appropriate control on the quantity of light cannot be executed based on the monitor light.

SUMMARY OF THE INVENTION

An object of the present invention is to provide a monitor optical device and an optical pickup apparatus for solving the above-described problems. More particularly an object of the present invention is to provide a monitor optical device and an optical pickup apparatus capable of achieving appropriate control on the quantity of light with as few components as possible without being influenced by fluctuation in the wavelength of the light source.

The above-described object is achieved by an optical device disposed on an optical path between a light source and an optical disk, comprising: a first region for introducing part of light beam emitted from the light source to a monitor detector; and a second region for introducing the remainder of the light beam to the optical disk, wherein the first region is formed at least within the second region.

The above-described object is achieved by an optical pickup apparatus comprising: a light source emitting light beam; an optical device disposed on an optical path between the light source and an optical disk; and a monitor device controlling the output of light beam emitted from the light source, wherein the optical device comprises: a first region introducing part of light beam emitted from the light source to the monitor device; and a second region introducing the remainder of the light beam to the optical disk, and wherein the first region is formed at least within the second region. In the meantime, the light source may be single or plural.

The above-described object is achieved by an optical pickup apparatus comprising: a first light source emitting a first light beam having a first wavelength; a second light source emitting a second light beam having a second wavelength; an optical device disposed on an optical path between the light sources and an optical disk; and a monitor device controlling the output of light beams emitted from the light sources, wherein the optical device comprises: a first region transmitting part of the first light beam and reflecting part of the second light beam to introduce part of the first and second light beams to the monitor device; and a second region reflecting the remainder of the first light beam and transmitting the remainder of the second light beam to introduce the remainder of the first and second light beams to the optical disk, and wherein the first region is formed at least within the second region.

The above-described object is achieved by an optical pickup apparatus comprising: a light source emitting light beam; an polarization separation device disposed on an optical path between the light source and an optical disk for transmitting or reflecting incident light beam depending on a polarization state of the incident light beam; and a monitor device controlling the output of light beam emitted from the light source, wherein the polarization separation device comprises: a first region introducing part of light beam emitted from the light source to the monitor device; and a second region introducing the remainder of the light beam to the optical disk, and wherein the first region is formed at least within the second region.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENTS

First Embodiment

A preferred embodiment of the present invention will be described with reference to the accompanying drawings.

Figure 2:
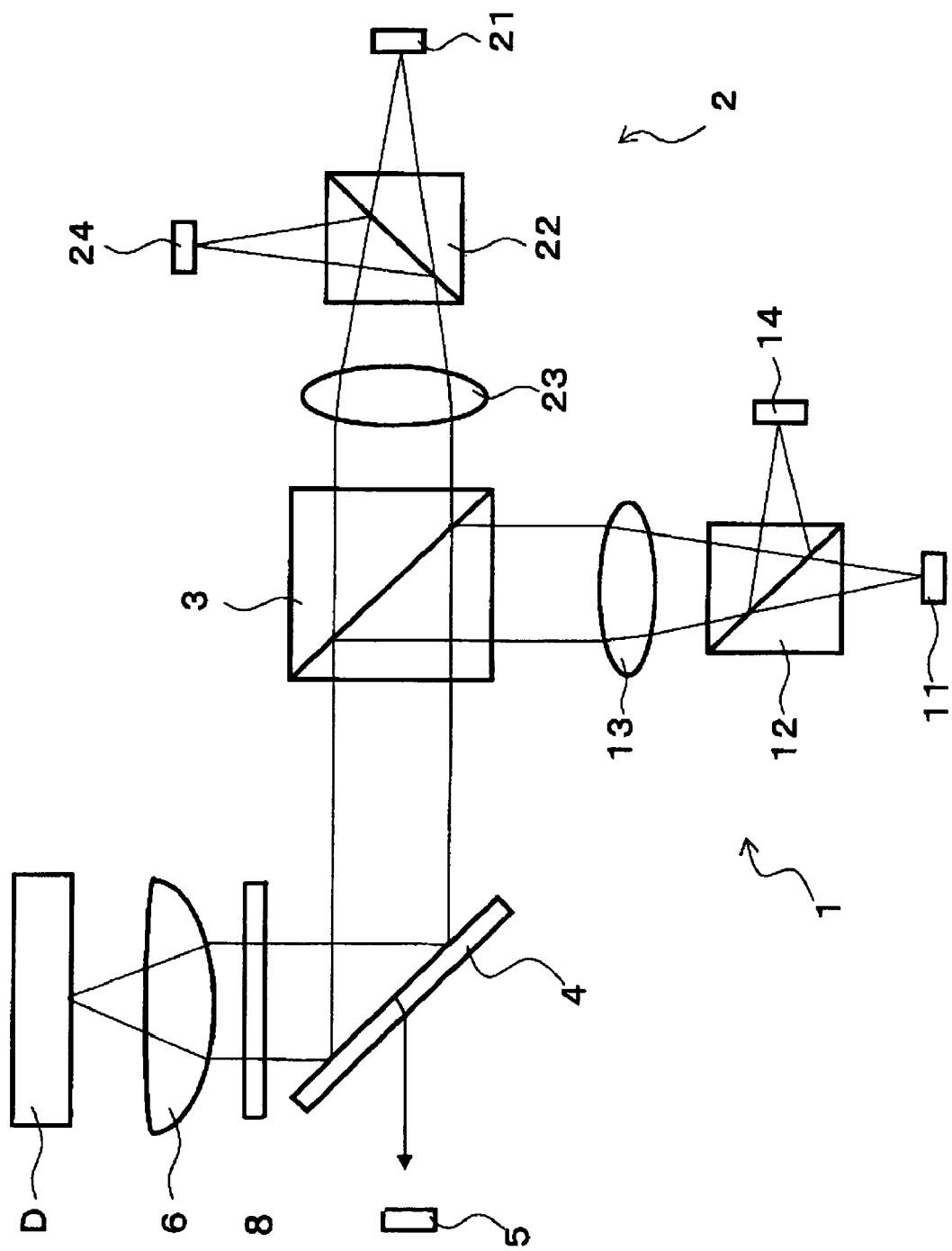
FIG. 2 is an explanatory diagram showing the structure of the optical pickup.

FIG. 2 is an explanatory diagram showing the structure of an optical pickup apparatus of this embodiment. This optical pickup apparatus comprises a first light source portion 1, a second light source portion 2, a dichroic prism 3, a rise-up mirror 4, a monitor detector 5 and an objective lens 6. The rise-up mirror is disposed on the upstream side of an optical path to an optical disk for bending the optical path. In the optical path between the rise-up mirror 4 and the objective lens 6 is provided a ¼ wavelength plate 8.

The first light source portion 1 comprises a light source 11, a polarization beam splitter (hereinafter referred to as PBS) 12, a collimator lens 13 and a light receiving device 14. The light source 11 emits for example, laser beam having wavelength of 405 nm (blue laser) as light beam. The PBS 12 allows linearly polarized laser beam emitted from the light source 11 to go through (for example, allows P polarized beam to go through) and reflects return beam from the optical disk D (for example, S polarized beam) to introduce to the light receiving device 14. The collimator lens 13 makes laser beam impinging through the PBS 12 to parallel beam. The light receiving device 14 receives return light from the optical disk D, impinging through the PBS 12. When a high density recording optical disk corresponding to blue laser is played back, servo signal (focus error signal, tracking error signal), information signal, aberration signal and the like are detected upon receiving light with the light receiving device 14.

The second light source portion 2 comprises a light source 21, a PBS 22, a collimator lens 23 and a light receiving device 24. The light source 21 emits laser beam having wavelength of 660 nm (for DVD) and laser beam having wavelength of 780 nm (for CD) as light beam. That is, the light source 21 is a light source for emitting laser beams of two wavelengths. The PBS 22 allows linearly polarized laser beam emitted from the light source 21 to go through (for example, allows the P polarized beam to go through) and reflects return light from the optical disk D (for example, S polarized beam) to introduce to the light receiving device 24. The collimator lens 23 makes laser beam impinging through the PBS 22 to parallel beam. The light receiving device 24 receives return light from the optical disk D impinging through the PBS 22. When a DVD or CD is played back, servo signal (focus error signal, tracking error signal), information signal, aberration signal and the like are detected upon receiving light with the light receiving device 24.

The dichroic prism 3 reflects laser beam supplied from the first light source 1 and introduces to the rise-up mirror 4 and then, allows laser beam supplied from the second light source portion 2 to go through and introduces to the rise-up mirror 4. That is, the dichroic prism 3 is an optical path converting device which converts traveling directions of respective laser beams impinging from different directions to the same one before emitting.

The rise-up mirror 4 is disposed between the light sources 11, 21 and the optical disk D, more specifically in an optical path between the dichronic prism 3 and the objective lens 6, having a function of bending the optical path of laser beam emitted from the dichroic prism 3, traveling toward the optical disk D. Although under normal circumstances, this rise-up mirror 4 reflects all impinging laser beam and introduce to the optical disk D, according to this embodiment, part of the laser beam emitted from the light sources 11, 21 is introduced to the monitor detector 5 while remaining laser beam is introduced to the optical disk D. According to this embodiment, the rise-up mirror 4 is equipped with a function as a monitor optical device. In the meantime, the detail of the rise-up mirror 4 will be described later.

The monitor detector 5 receives part of laser beam emitted from the respective light sources 11, 21 for monitoring and is composed of for example, a photo diode. Based on the amount of light received by this monitor detector 5, output of laser beam emitted from the respective light sources 11, 21 is controlled by a control portion (not shown). Because according to this embodiment, the laser beam emitted forward (toward the optical disk D) from the respective light sources 11, 21 is monitored by the monitor detector 5, the front monitor type is adopted.

Under the above-described structure, P polarized beam of the linearly polarized laser beam emitted from the light source 11 passes through the PBS 12 and impinges upon the collimator lens 13. Then, laser beam, after made to parallel beam by the collimator lens 13, is reflected by dichronic prism 3 and impinges upon the rise-up mirror 4. On the other hand, of the linearly polarized laser beam emitted from the light source 21, for example, P polarized beam passes through the PBS 22 and impinges upon the collimator lens 23. The laser beam, after made to parallel beam by the collimator lens 23, passes through the dichronic prism 3 and impinges upon the rise-up mirror 4.

In the rise-up mirror 4, part of the laser beam emitted from the light sources 11, 21 is introduced to the monitor detector 5, in which it is monitored. On the other hand, remainder of laser beam emitted from the light sources 11, 21 is reflected by the rise-up mirror 4 and circularly polarized by the ¼ wavelength plate 8. After that, it is converged on the optical disk D by the objective lens 6.

Return light from the optical disk D impinges on the ¼ wavelength plate 8 through the objective lens 6 and after converted to the linearly polarized beam (for example, S polarized beam) here, it impinges upon the rise-up mirror 4. After reflected by the rise-up mirror 4, it impinges upon the dichronic prism 3. If at this time, the return light is return light of the laser beam emitted from the light source 11, the return light impinging on the dichronic prism 3 is reflected by the dichronic prism 3 and impinges upon the PBS 12 through the collimator lens 13. In the PBS 12, the return light is reflected and then received by the light receiving device 14. On the other hand, if the return light is return light of the laser beam emitted from the light source 21, the return light impinging upon the dichronic prism 3 passes through the dichronic prism 3 and impinges upon the PBS 33 through the collimator lens 23. In the PBS 22, the impinging return light is reflected and then received by the light receiving device 24.

Next, the detail of the rise-up mirror 4 as a monitor optical device will be described.

Figure 1:
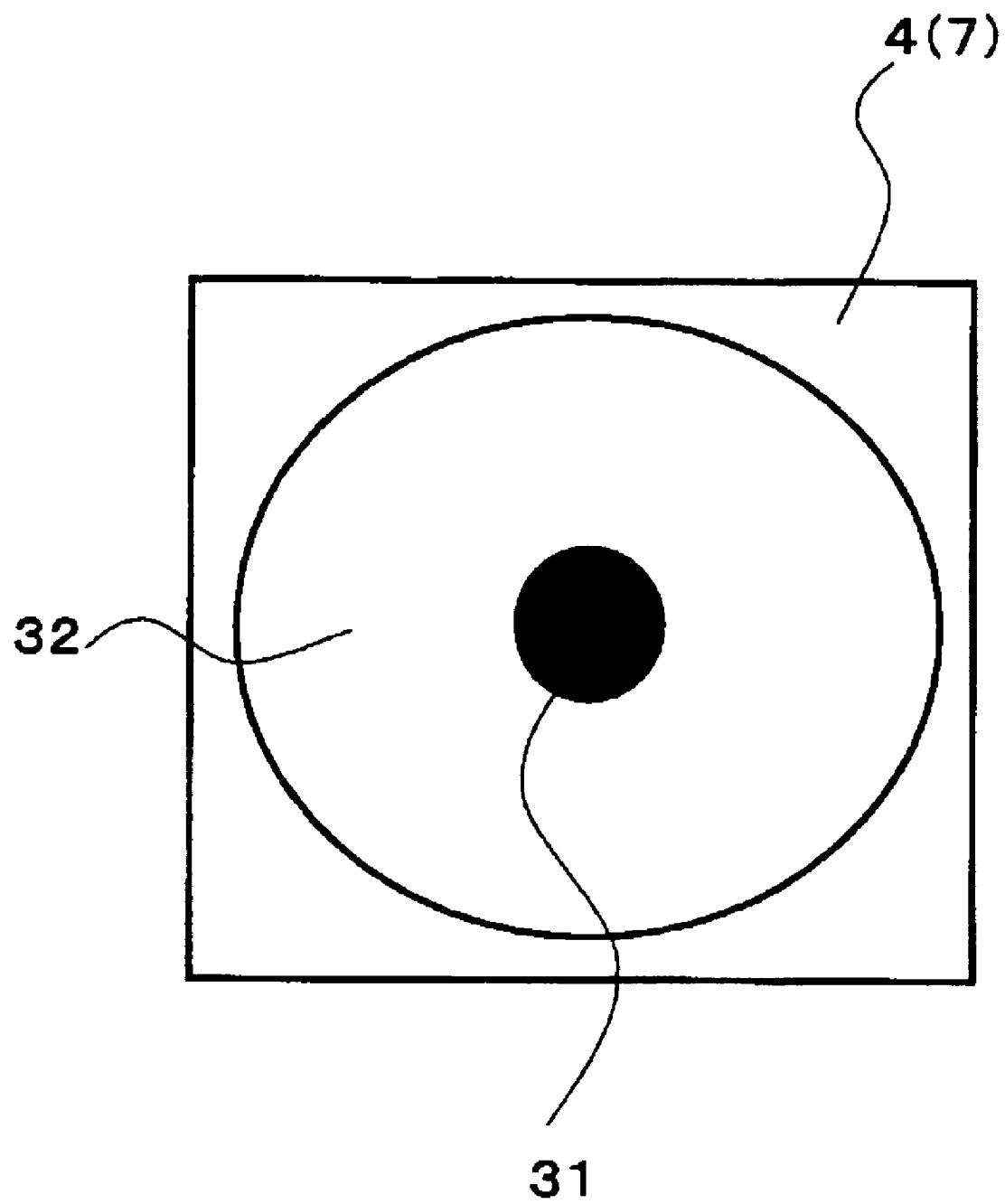
FIG. 1 is a plan view showing schematically the structure of a rise-up mirror for use in an optical pickup according to an embodiment of the present invention.

FIG. 1 is a plan view showing schematically the structure of the rise-up mirror of this embodiment. This rise-up mirror 4 comprises a first region 31 and a second region 32.

The first region 31 is a region for introducing part of laser beam emitted from the light sources 11, 21 to the monitor detector 5 and according to this embodiment, a transmission region which allows incident light to pass through. As this first region 31, it is permissible to form anti-reflection film (AR film) on a glass substrate which is a transparent substrate or it is permissible not to provide the anti-reflection film.

Figure 3:
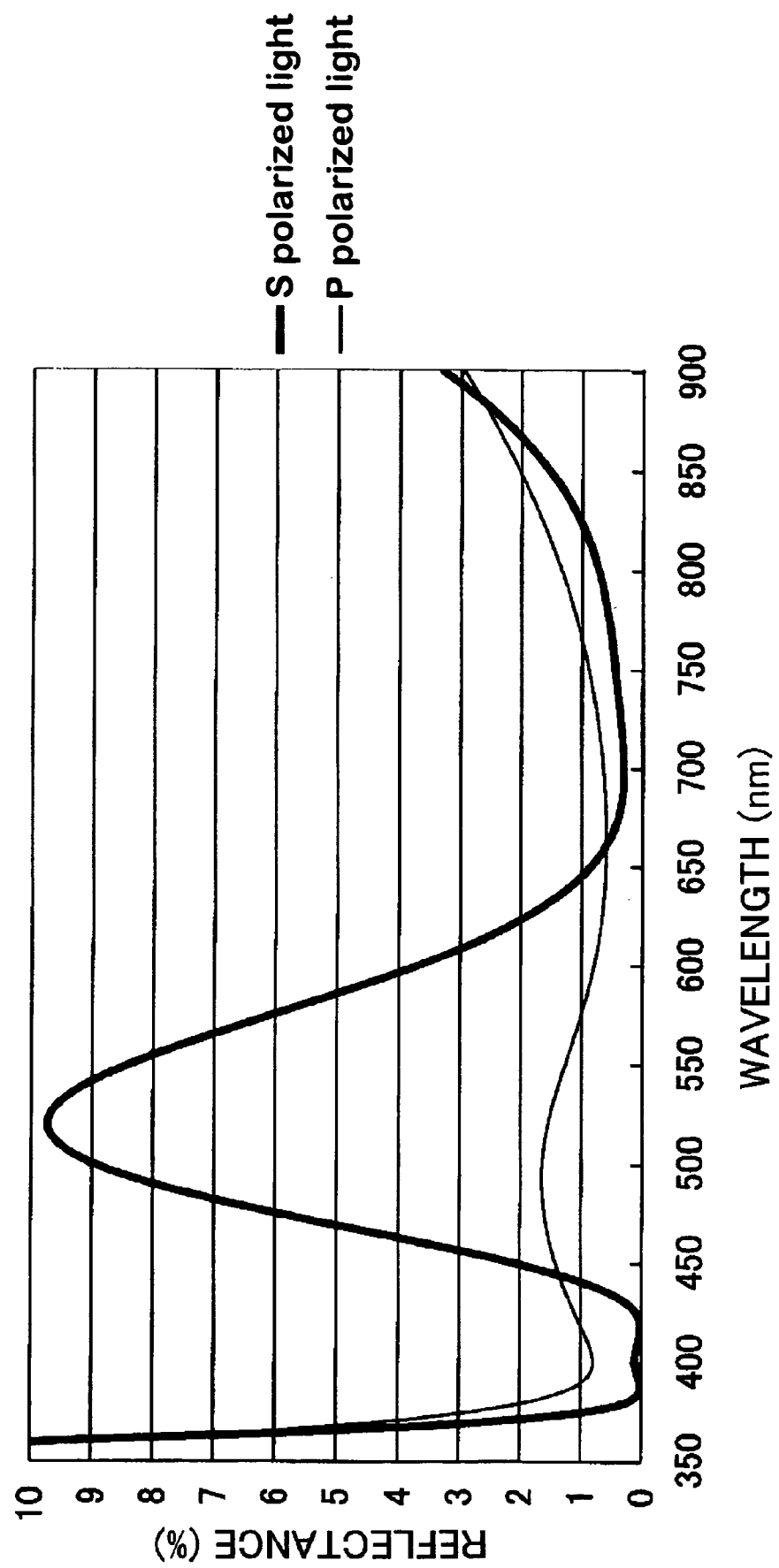
FIG. 3 is an explanatory diagram showing the spectral reflectance of a first region of the rise-up mirror.

Here, FIG. 3 indicates the spectral reflectance of the first region 31. In the first region 31, reflectance in the vicinity of 405 nm, 660 nm, 780 nm in wavelength is suppressed to low level, so that it is possible to transmit laser beams of these wavelengths and monitor.

On the other hand, the second region 32 is a region for introducing remainder of the laser beam emitted from the light sources 11, 21 to the optical disk D. A line indicating the contour of the second region 2 indicates an outer edge of flux of laser beam impinging on the rise-up mirror 4. This second region 32 is a reflection region for reflecting the impinging light and according to this embodiment, dielectric multi-layer film is formed on the glass substrate. In the meantime, the second region 32 may be produced by forming the dielectric multi-layer film and metallic film together on a glass substrate.

If the second region 32 is formed of only for example, aluminum, its reflectance is only 93%, which is low for the purpose. If the second region 32 is formed of for example, silver, its reliability is low because silver corrodes fast as it is used over a long period. Therefore, if the second region 32 is formed containing at least dielectric multi-layer film, there is little fear that it may corrode during a long period of use, so that a highly reliable rise-up mirror 4 can be achieved.

Figure 4:
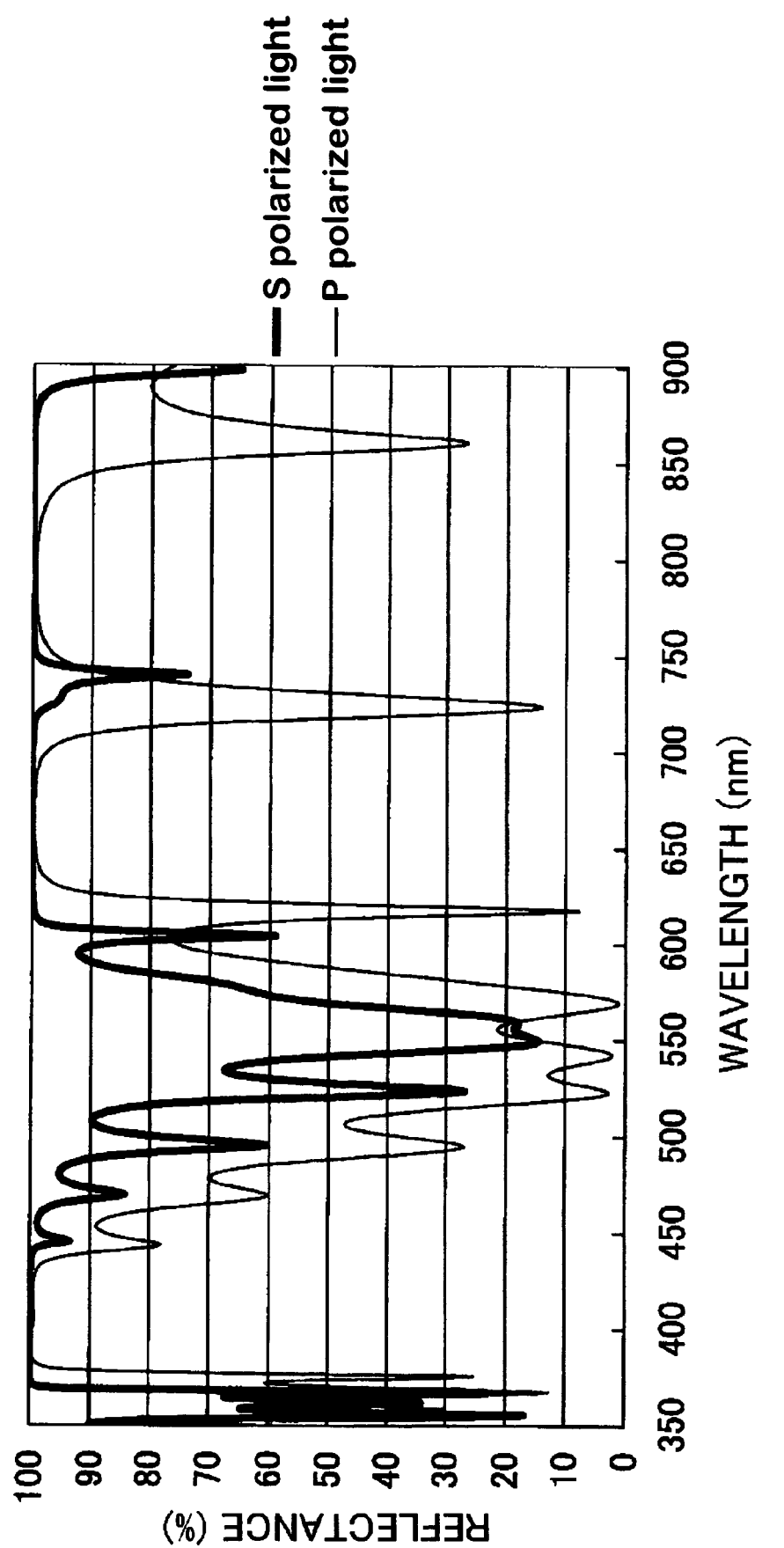
FIG. 4 is an explanatory diagram showing the spectral reflectance of a second region of the rise-up mirror.

FIG. 4 shows spectral reflectance of the second region 32. In the second region 32, its reflectance in the vicinity of 405 nm, 660 nm and 780 nm in wavelength is set to 96% or higher. As a consequence, when the laser beams of these wavelengths impinge on the second region 32, they are reflected by the second region 32 securely and advanced to the optical disk D, so as to reproduce recording of the optical disk D.

According to this embodiment, as shown in FIG. 1, the first region 31 is formed within the second region 32. That is, the first region 31 is formed within a region in which flux of laser beam advancing to the optical disk D strikes the rise-up mirror 4. Particularly according to this embodiment, the first region 31 is formed within the second region 32 and in a plane intersecting the optical axis of laser beam emitted from the light sources 11, 21 as a single spot containing the center of the optical axis.

Because the first region 31 is formed as the spot containing the center of the optical axis, of laser beam introduced to the optical disk D through the second region 32, light around that optical axis can be removed out in the direction to the monitor detector 5 by this spot-like first region. Namely, it can be said that the intensity distribution of the laser beam is changed by the optical device for light monitor (rise-up mirror 4). As a consequence, the intensity of the laser beam irradiated to the optical disk D can be reduced about only a portion around the optical axis so that the laser beam to be irradiated to the optical disk D can be converged sharply (super resolution effect). Thus, even if there is more or less design error in for example, the objective lens 6 or the like, light spot having an appropriate diameter can be projected to the optical disk D, so that reproduction and recording on the optical disk D can be achieved securely. That is, the design error in an optical device constituting the optical pickup can be absorbed by the above-described design of the rise-up mirror 4.

The area of the first region 31 is set to be 5% or more and not more than 20% of the area of the second region 32. By specifying the area ratio between the first region 31 and the second region 32 in this way, while securing monitor beam through the first region 31 securely, an appropriate amount of laser beam can be supplied to the optical disk D through the second region 32. In the meantime, the effect of specifying the area ratio in this way can be applied to the structure shown in FIGS. 5-8, which will be described later.

If the first region 31 is formed in the shape of a spot as shown in FIG. 1, it can be said that the first region 31 stays within the second region 32 and is formed within a region occupying 80% of the second region 32, containing the center of the optical axis of laser beam emitted from the light sources 11, 21. The shape of the first region 31 may be circular, elliptic or of other shape as long as it is of a shape containing the optical axis center.

In the meantime, the first region 31 may be formed in plural quantity within the second region 32 or within a region extending from inside to outside of that region, in a plane intersecting the optical axis of laser beam emitted from the light sources 11, 21. Hereinafter, such an example will be described with reference to FIGS. 5-8.

Figure 5:
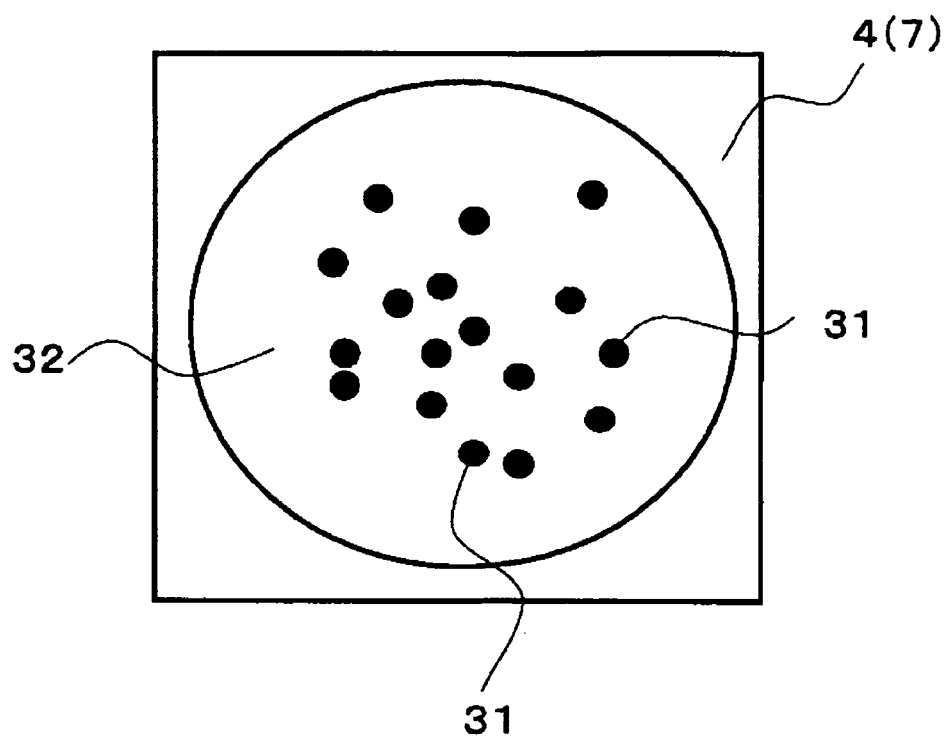
FIG. 5 is a plan view of the rise-up mirror in which the first regions are disposed in plural quantity randomly in the shape of spots within the second region.
Figure 6:
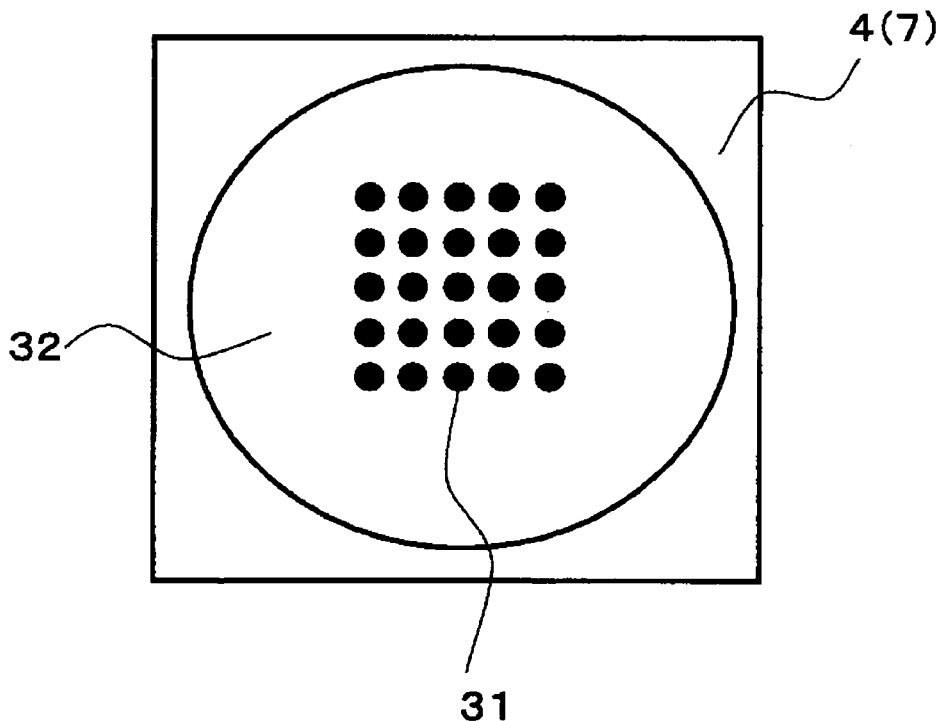
FIG. 6 is a plan view of the rise-up mirror in which the first regions are disposed in plural quantity randomly in the shape of spots within the second region.

FIGS. 5, 6 are plan views of the rise-up mirror 4 in which the first regions 31 are formed in plural spot-like configuration within the second region 32. Particularly FIG. 5 shows a case where plural spots constituting the first region 31 are disposed at random within the second region 32 and FIG. 6 shows a case where the plural spots constituting the first region 31 are disposed in a matrix within the second region 32.

If the plural spots as the first region 31 are disposed regularly, interference of light occurs due to that reason thereby possibly causing adverse effects on focusing of light to the optical disk D. If considering this point, the plural spots of the first region 31 are preferred to be disposed at random within the second region 32. However, unless such a trouble occurs, the plural spots of the first region 31 may be disposed in a matrix within the second region 32.

Further, if the first region 31 is constituted of plural spots, each spot is preferred to be a circle of 0.01 mm to 0.1 mm in diameter. In this case, a necessary quantity of light can be secured through the first region 31.

Figure 7:
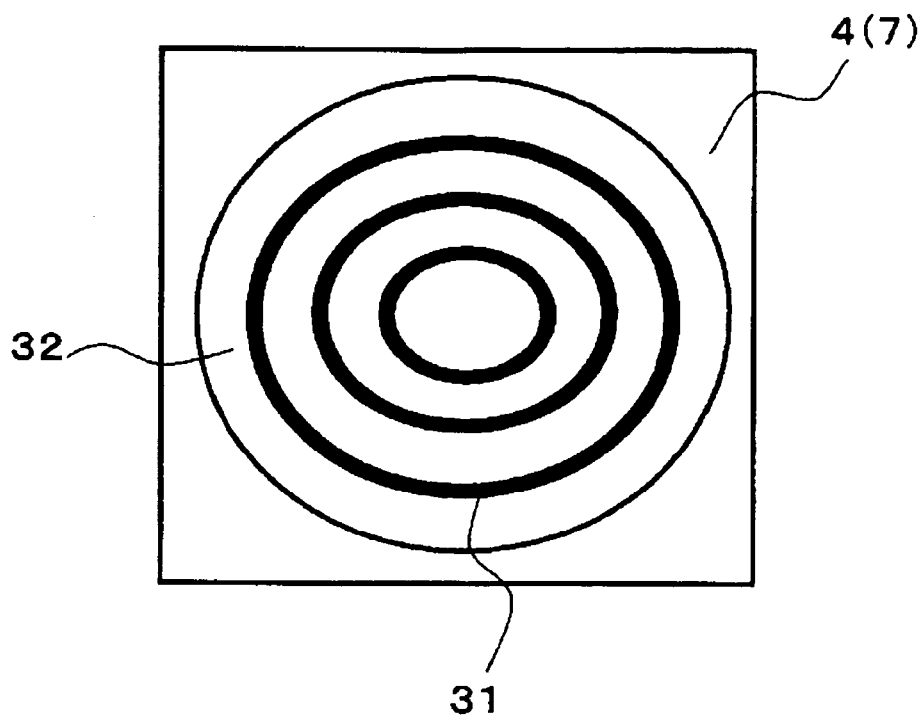
FIG. 7 is a plan view of the rise-up mirrors in which the first regions are formed within the second region and in the shape of plural rings within a plane intersecting the optical axis of laser beam emitted from the light source.

FIG. 7 is a plan view of a rise-up mirror 4 in which the first regions 31 are formed within the second region 32 and at the same time within a plane intersecting the optical axis of laser beam emitted from the light sources 11, 21 in the form of plural rings. Particularly in FIG. 7, the first regions 31 are formed in the form of plural rings which surround the optical axis center such that they are not in contact with each other. Even if the first region 31 is formed in this way, light quantity can be controlled appropriately based on monitor light obtained through the plural ring-like regions.

To secure the quality of light necessary for monitoring through the first region 31, the line width of the aforementioned ring is preferred to be 0.01 mm to 0.1 mm. Although the first region 31 is formed of plural rings in FIG. 7, it may be formed of a single ring.

Figure 8:
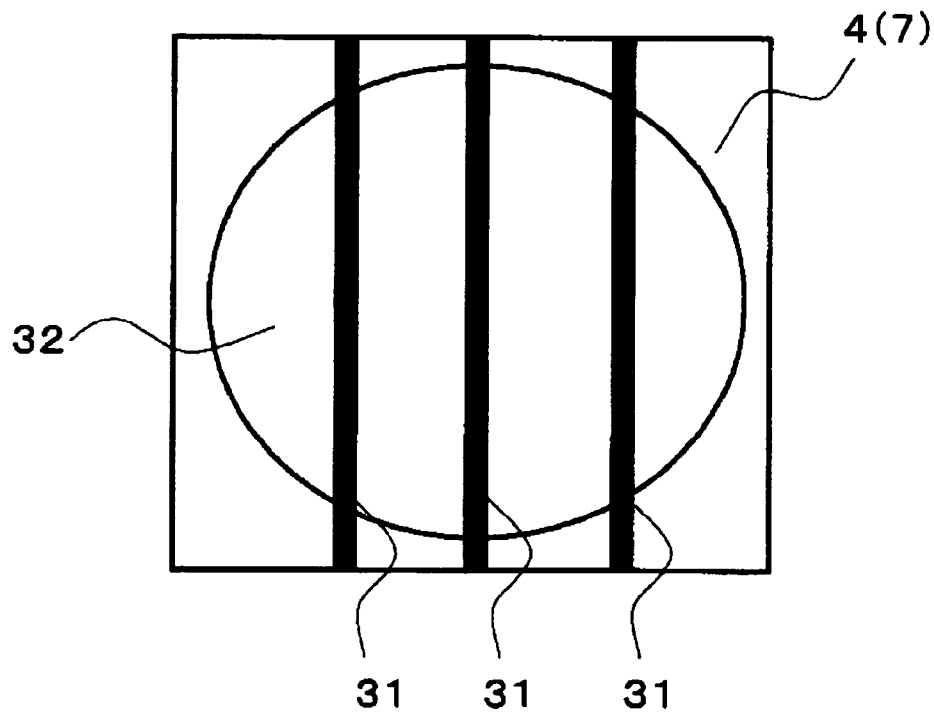
FIG. 8 is a plan view of the rise-up mirrors in which the first regions are formed within a plane intersecting the optical axis of laser beam emitted from the light source in the shape of plural slits.

FIG. 8 is a plan view of the rise-up mirror 4 formed in the shape of plural slits within a plane intersecting the optical axis of laser beam emitted from the light sources 11, 21. In FIG. 8, the first region 31 is formed of a slit passing the center of the optical axis and plural slits disposed symmetrically with respect to that slit. Even if the first region 31 is formed of such slits, appropriate control on the light quantity can be executed based on monitor light obtained through those slits. Further, because if the first region 31 is formed in the shape of slits, a mask corresponding to the slits is easy to manufacture and thus, the rise-up mirror 4 can be manufactured easily using that mask.

If the first region 31 is formed symmetrically with respect to the slit passing the center of the optical axis as shown in FIG. 8, distortion of light spot of light beam irradiated on the optical disk through the second region can be reduced extremely as compared with a case where the first region 31 is formed asymmetrically.

The slit as the first region 31 may be formed such that it stretches from the inside of the second region 32 to the outside as shown in FIG. 8 or only within the inside of the second region 32. Further, the slit as the first region 31 may be formed of only a single slit passing the center of the optical axis. To secure the quantity of light necessary for monitoring through the first region 31, the width of the slit is preferred to be 0.01 mm to 0.1 mm.

From the structures of the rise-up mirrors 4 shown in FIGS. 1, 5-8 described above, it can be said that the first region 31 only need to be formed at least within the second region 32.

Next, a manufacturing method of the rise-up mirror 4 having the first region 31 and the second region 32 will be described with reference to FIGS. 9A-9J.

Figure 9A:
FIGS. 9A-9J are sectional views showing the manufacturing steps of the rise-up mirror.

First, a sacrifice layer (first sacrifice layer) 42, about 1 μm thick is formed by sputtering on a glass substrate (transparent substrate) 41 (see FIG. 9A). This sacrifice layer 42 is formed of metal such as Cr and Al. The reason why such material is used is that these materials are easy to form in film by sputtering and in a following process, it is easy to etch (easy to dissolve in acid).

Subsequently, photosensitive polyimide 43 which is photo-curing resin, is applied onto the sacrifice layer 42 as first resist with a spin coater. The photosensitive polyimide 43 has a heat resistance of about 300° C. according to this embodiment and any material may be used if its heat resistance is more than 200° C. Then, photosensitive polyimide 43 is patterned by exposure to light (irradiation with ultraviolet ray) from above a glass mask having an opening portion matching the first region 31. By washing with solvent after exposure, the sensitive polyimide 43 is removed except its hardened portion (see FIG. 9B).

Next, the sacrifice layer 42 exposed on the surface is etched with etching solution (for example, ECR2 made by NACALAITESQUE, INC) so that a sacrifice layer 42 of a pattern corresponding to the pattern of the photosensitive polyimide 43 is left. And the glass substrate 41 is washed with organic solvent (see FIG. 9C). In this process, the sacrifice 42 is etched up to the inside of the pattern of the photosensitive polyimide 43.

Figure 9F:
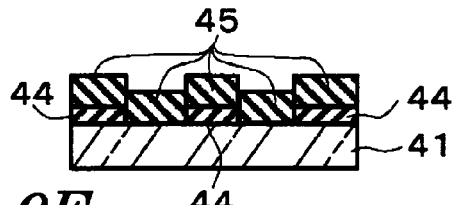
Figure 9B:
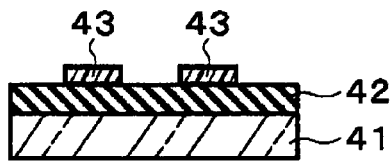
Figure 9G:
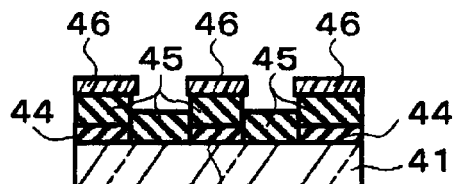
Figure 9C:
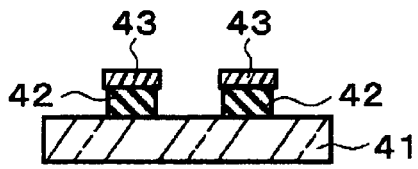
Figure 9H:
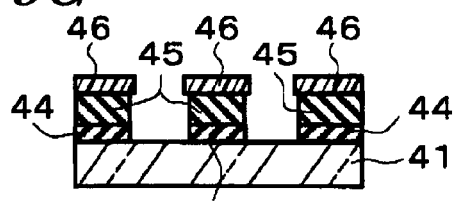
Figure 9D:
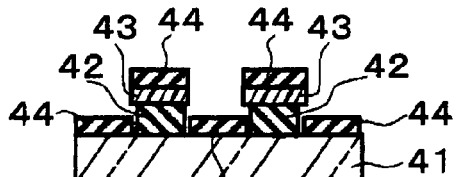
Figure 9I:
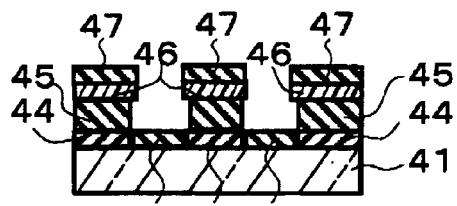

Then, dielectric multi-layer film 44 (first dielectric multi-layer film) having the characteristic of FIG. 4 is formed on the glass substrate 41 so as to cover the photosensitive polyimide 43 and the remaining sacrifice layer 42, according to, for example, vacuum deposition method (see FIG. 9D). At this time, the dielectric multi-layer film 44 is formed by heating at 200° C. or higher.

Here, as the dielectric multi-layer film 44, for example, metallic oxide multi-layer film can be considered and this can be formed using $Ta_2O_5$, $TiO_2$, $Nb_2O_3$ having refractive index of 2 to 2.3 or $SiO_2$, $MgF_2$ having refractive index of 1.3 to 1.5. According to this embodiment, the dielectric multi-layer film 44 is formed so that metallic oxide having a high refractive index and metallic oxide having a low refractive index overlap alternately.

Subsequently, remaining sacrifice layer 42 and the dielectric multi-layer film 44 above it are removed by etching (see FIG. 9E). As a consequence, a region in which the dielectric multi-layer film 44 is not formed, that is, a region in which the sacrifice layer 42 is removed and a region in which the dielectric multi-layer film 44 is formed are left.

The region in which the sacrifice layer 42 is removed can be defined as a transmission region by only the glass substrate 41. Further, because the dielectric multi-layer film 44 is a reflection film having the characteristic of FIG. 4, its formation region turns to a reflection region. Thus, with the condition of FIG. 9E, a final rise-up mirror 4 can be completed. In this case, because the region from which the sacrifice layer 42 is removed is a transmission region, this region corresponds to the first region 31 of the rise-up mirror 4 and because the region in which the dielectric multi-layer film 44 is formed is a reflection region, it corresponds to the second region 32.

Figure 9E:
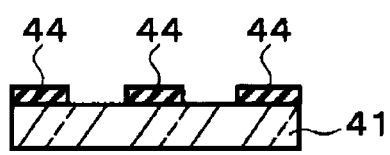

Further, by taking following steps from the condition of FIG. 9E, it is permissible to complete a final rise-up mirror 4.

That is, a sacrifice layer 45 (second sacrifice layer) about 1 μm thick is formed on the glass substrate 41 of FIG. 9E by sputtering (see FIG. 9F). This sacrifice layer 45 is formed using Cr and Al as material like the sacrifice layer 42.

Subsequently, photosensitive polyimide 46 is applied on the sacrifice layer 45 as a second resist with a spin coater. The photosensitive polyimide 46 has heat resistance of about 300° C. like the photosensitive polyimide 43 and this needs to be formed of material whose heat resistance is higher than 200° C. Then, photosensitive polyimide 46 is patterned by exposing light from above a glass mask having an opening corresponding to the second region 32. By washing with solvent after exposure to light, the photosensitive polyimide 46 is removed except its hardened portion (see FIG. 9G). As a result, the hardened photosensitive polyimide 46 is formed corresponding to the formation region of the dielectric multi-layer film 44.

Next, the sacrifice layer 45 exposed on the surface is etched with etching solution so that the sacrifice layer 45 is left with a pattern corresponding to the pattern of the photosensitive polyimide 46 and washed with organic solvent (see FIG. 9H). With this process, the sacrifice 45 is etched up to the inside of the pattern of the photosensitive polyimide 46.

Then, the dielectric multi-layer film 47 (second dielectric multi-layer film) having the characteristic of FIG. 3 is formed according to for example, vacuum deposition method (see FIG. 9I) so as to cover the photosensitive polyimide 46 and remaining sacrifice layer 45 on the glass substrate 41. At this time, the dielectric multi-layer film 47 is formed by heating to higher than 200° C. As the dielectric multi-layer film 47, AR film composed of the same metallic oxide as the dielectric multi-layer film 44 can be considered.

Figure 9J:
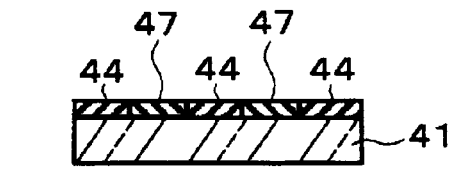

Subsequently, the remaining sacrifice layer 45 and the dielectric multi-layer film 47 above it are removed by etching (see FIG. 9J). As a result, a region in which the dielectric multi-layer film 44 is formed and a region in which the dielectric multi-layer film 47 is formed are left on the glass substrate 41. Because the region in which the dielectric multi-layer film 44 is formed functions as a reflection region because it has the characteristic of FIG. 4, it corresponds to the second region 32 in the rise-up mirror 4. Further, because the region in which the dielectric multi-layer film 47 is formed functions as a transmission region having the characteristic of FIG. 3, it corresponds to the first region 31 of the rise-up mirror 4.

Although the dielectric multi-layer films 44, 47 are formed according to the vacuum deposition method, the present invention is not restricted to this example, but this may be achieved according to, for example, sputtering method or CVD method. Further, although patterning of the dielectric multi-layer films 44, 47 is carried out by lift-off method, it may be achieved according to masking method or laser ablation method.

To increase the use efficiency of light, it is permissible to form the dielectric multi-layer film 47 having the characteristic of FIG. 3 on a rear surface of the rise-up mirror 4. In this case, the dielectric multi-layer film 47 does not need to be patterned but it only needs to be formed on the entire rear face of the rise-up mirror 4.

Although according to this embodiment, the dielectric multi-layer film 44 corresponding to the second region 32 is formed and after that, the dielectric multi-layer film 47 corresponding to the first region 31 is formed, if both the dielectric multi-layer films 44, 47 are formed, it is permissible to form the dielectric multi-layer film 47 first and then the dielectric multi-layer film 44.

The rise-up mirror 4 of this embodiment comprises the first region 31 for introducing part of laser beam emitted from the light sources 11, 21 to the monitor detector 5 and the second region 32 for introducing the remainder of the light beam to the optical disk D and the first region 31 is formed at least within the second region 32. Even if spreading of laser beam changes depending on changes in power of the light sources 11, 21 and changes in temperatures, change in light quantity of the laser beam impinging on the inside of the second region 32 is not larger than change in light quantity of light beam impinging on the surrounding of the second region 32. Therefore, according to the above-described configuration, even if laser power changes, appropriate light quantity control can be achieved based on monitor light obtained through the first region 31 formed within the second region 32.

According to the structure of this embodiment, the ratio of light quantity between monitor light and disk reproduction light separated by the rise-up mirror 4 is determined substantially by the area ratio between the first region 31 and the second region 32. Therefore, even if the wavelength of laser beam impinging upon the rise-up mirror 4 changes depending on disparity of quality upon manufacturing of the light sources 11, 21, changes in temperature and the like, laser beam impinging upon the first region 31 can be used as monitor light regardless of the changes in wavelength. Thus, despite the disparity of quality of the light sources 11, 21 and changes in temperature, the light quantity can be controlled appropriately based on the above-mentioned monitor light.

Because according to the structure of this embodiment, the ratio of light quantity between the monitor light and disk reproduction light is determined substantially by the area ratio between the first region 31 and the second region 32 although the reflectance of the second region 32 changes by about 1% easily due to manufacturing error, the disk reproduction light can be obtained by receiving little deviation in reflectance (manufacturing error) of the second region 32.

The rise-up mirror 4 has a function of bending laser beam toward the optical disk D halfway of its optical path and has a reflection region originally. Therefore, even if no special optical device for picking out monitor light is provided in the optical path in order to pick up the monitor light from laser beam emitted from the light sources 11, 21, a monitor optical device can be achieved easily with the rise-up mirror 4 by forming a transmission region in the rise-up mirror 4 as said in this embodiment. Thus, even if plural light sources are provided corresponding to different wavelengths, the monitor optical device can be achieved with a single rise-up mirror 4 by adopting a configuration of introducing light beams of respective wavelengths to the rise-up mirror 4, thereby avoiding complexity of the apparatus and increase of manufacturing cost.

According to the above-described manufacturing method of the rise-up mirror 4, the sacrifice layer 42 is etched up to the inside of the pattern of the photosensitive polyimide 43 in the process of FIG. 9C. As a consequence, a gap corresponding to a difference in pattern between the photosensitive polyimide 43 and the sacrifice layer 42 can be provided between that sacrifice layer 42 and the dielectric multi-layer film 44 formed on the glass substrate 41 in the step of FIG. 9D. As a result, the sacrifice layer 42 becomes easy to remove by etching in the step of FIG. 9E and thus, the sacrifice layer 42 can be removed completely by etching. Consequently, edges of the dielectric multi-layer film 44 can be prevented from drooping. That is, the edges of the dielectric multi-layer film 44 can be formed sharply.

Because the photosensitive polyimides 43, 46 are composed of material whose heat resistance is higher than 200° C., this can withstand high temperature (200° C.) in formation of the dielectric multi-layer films 44, 47. Therefore, it is possible to form the dielectric multi-layer films 44, 47 having a high durability.

If the rise-up mirror 4 is completed in steps up to FIG. 9E, that is, the rise-up mirror 4 is completed by only patterning of the dielectric multi-layer film 44 corresponding to the second region 32 without forming the dielectric multi-layer film 47 corresponding to the first region 31, the reflectance to an incident angle of 45° of a portion in which no dielectric multi-layer film 44 is formed (first region 31) is about 1% in case where P polarized light impinges and about 10% incase where S polarized light impinges. Because the rear face of the rise-up mirror 4 has a similar reflectance, totally speaking, the quantity of monitor light drops by about 2% in case where the P polarized light impinges and about 20% in case where S polarized light impinges.

Thus, if an optical pickup in which the P polarized light impinges on the rise-up mirror 4 for monitor is constructed, the reduction of the light quantity is as small as about 2%. On the other hand, if an optical pickup in which the S polarized light impinges on the rise-up mirror 4 for monitor is constructed, the reduction of the light quantity is relatively large, about 20% and however, the purpose can be satisfied by increasing an area (area of the first region 31) of a pattern to be lifted off in advance by that amount.

The wavelength dependency of reflectance depends on dispersion of glass. Thus, if a glass having a small dispersion is selected as the glass substrate 41, deflection in quantity of monitor transmission light to the wavelength shift in laser beam can be suppressed, thereby leading to reduction of manufacturing cost.

By the way, a region which light passes may differ between blue laser beam and laser beam for CD and DVD and even if the area of the first region 31 is set to 5% the area of the second region 32, the quantity of monitor light may change depending on laser beam passing the first region 31.

Figure 10:
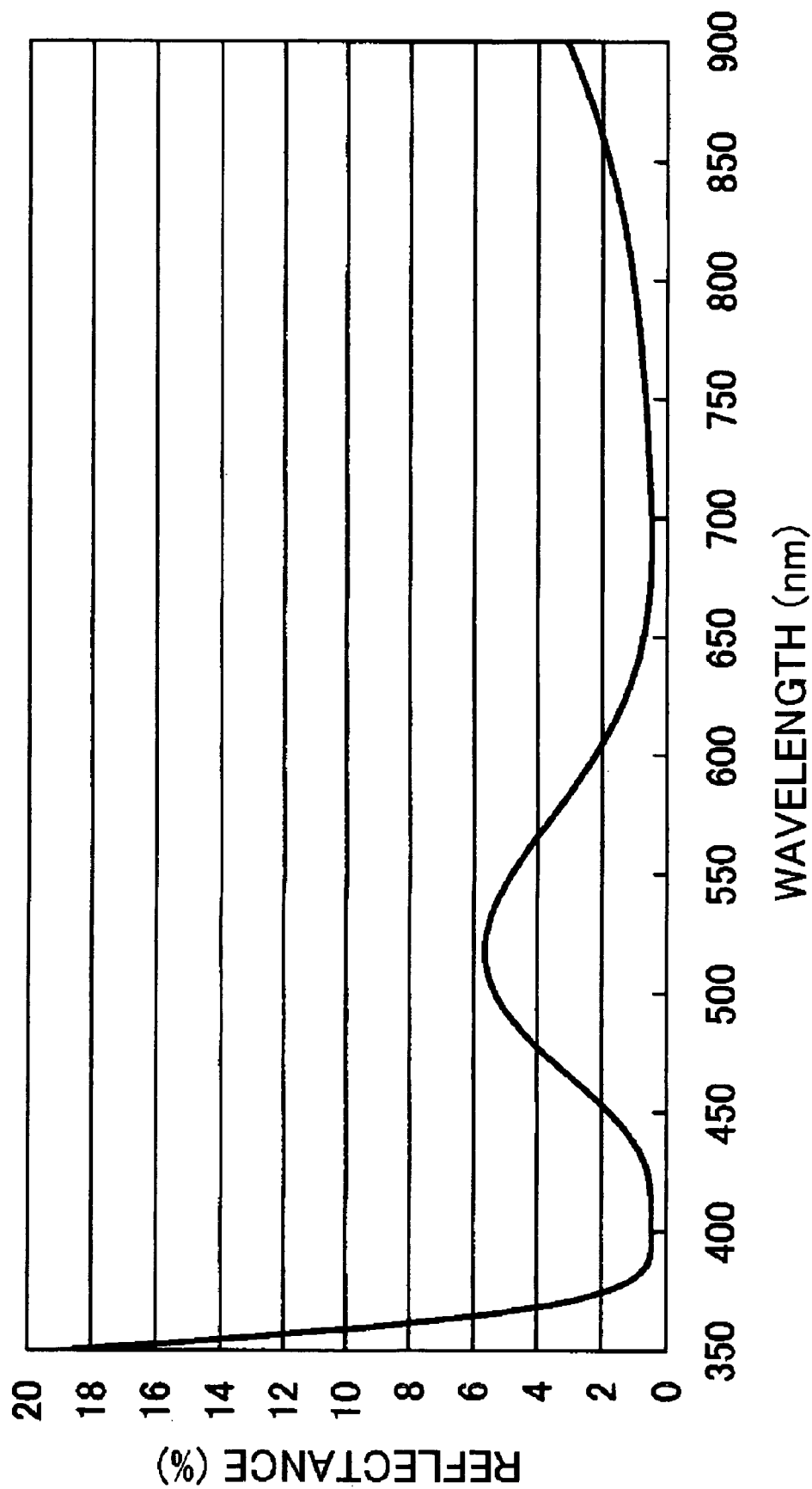
FIG. 10 is an explanatory diagram showing the spectral reflectance of the first region with an average of P polarization and S polarization.
Figure 11:
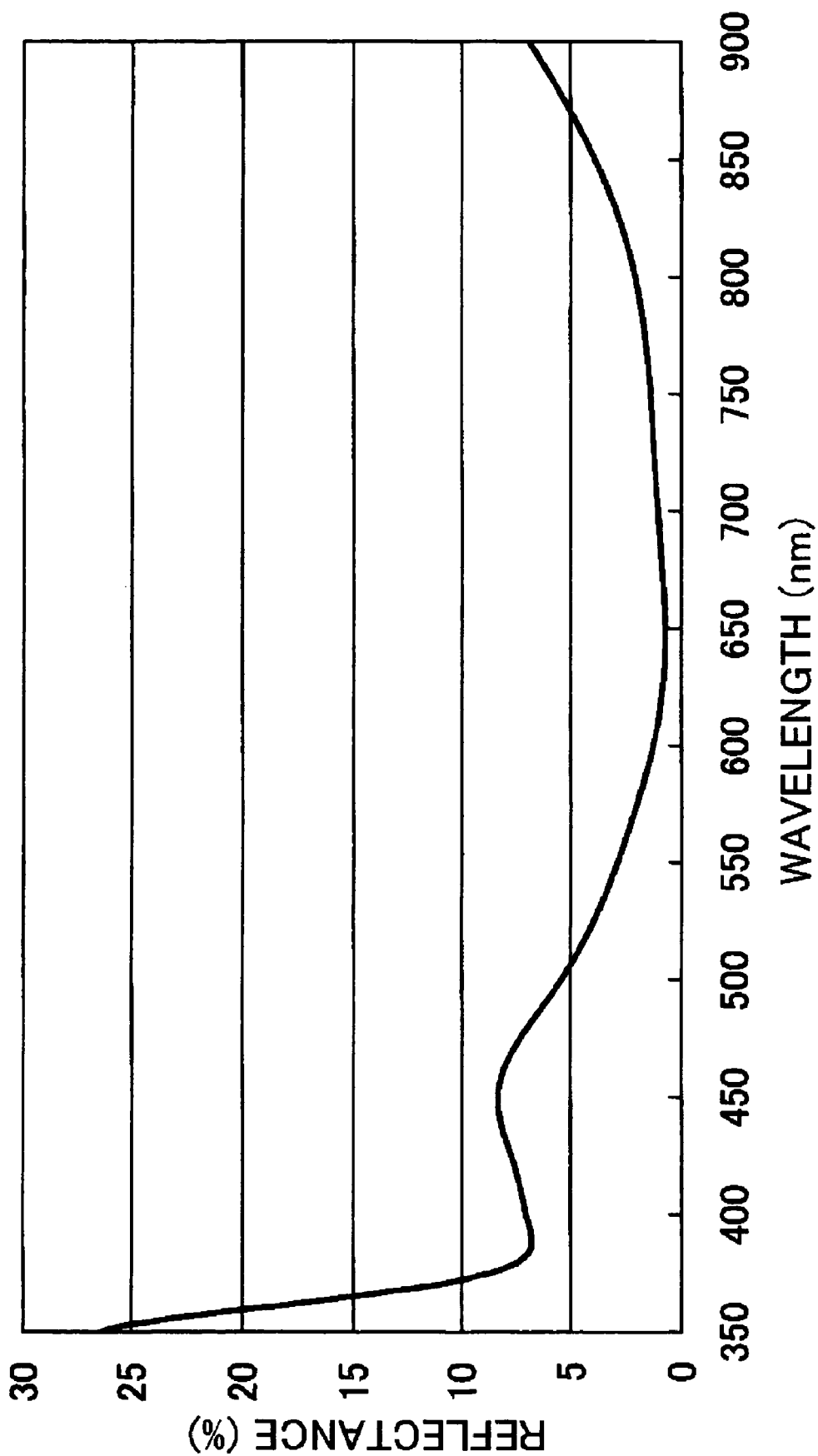
FIG. 11 is an explanatory diagram showing other example of the spectral reflectance of the first region.

Then, correction of transmissivity depending on the wavelength of transmitted beam may be carried out in the first region 31. For example, FIG. 10 shows the spectral reflectance of the first region 31 shown in FIG. 3 with an average between the P polarized light and the S polarized light. On the other hand, FIG. 11 shows the spectral reflectance of the first region 31 in case where the reflectance of blue laser beam (405 nm) is increased more than FIG. 10. Because generally, the blue laser beam has wider optical flux than the laser beam for CD and DVD, deflection in the quantity of monitor light due to the wavelength of impinging laser beam can be blocked by forming the first region 31 with the dielectric multi-layer film 47 having the characteristic shown in FIG. 11.

In the meantime, although a case where plural light sources are provided has been described for this embodiment, it is possible to adapt the rise-up mirror 4 of this embodiment to an optical system having a single light source.

Meanwhile, the present invention can be expressed as follows.

The monitor optical device of the present invention is a monitor optical device disposed in an optical path between a light source and an optical disk and has a first region for introducing part of light beam emitted from the light source to the monitor detector and a second region for introducing remainder of the light beam to the optical disk. The first region and the second region are formed on the same plane of a substrate and the first region is formed at least within the second region. The inside of the second region mentioned here is a concept including not only the inside of the second region but also an area extending from the inside of the second region to the outside.

According to the monitor optical device of the present invention, the second region is formed including the dielectric multi-layer film while the first region is formed with an opening portion made in the second region.

Second Embodiment

Other embodiment of the present invention will be described with reference to the accompanying drawings. In the meantime, like reference numerals are attached to the same components as the first embodiment and description thereof is omitted.

Figure 12:
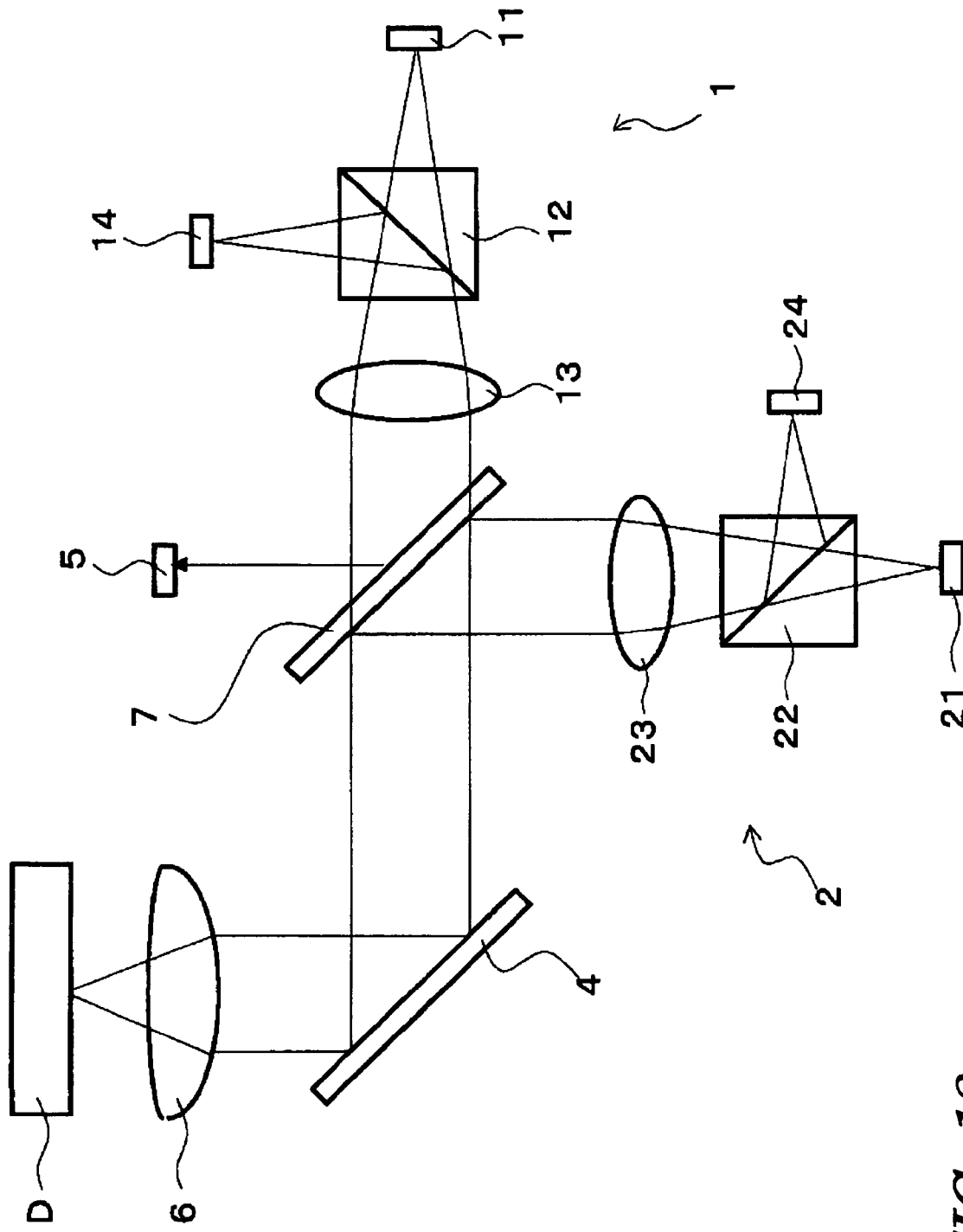
FIG. 12 is an explanatory diagram showing the structure of an optical pickup of other embodiment of the present invention.

FIG. 12 is an explanatory diagram schematically showing the structure of an optical pickup apparatus of this embodiment. This embodiment has the same structure as the first embodiment except that a dichroic mirror 7 is used instead of the dichroic prism 3 of the first embodiment and the monitor detector 5 receives monitor light through the dichroic mirror 7.

The dichroic mirror 7 is a wave multiplexer which is disposed between the light sources 11, 21 and the optical disk D and transmits or reflects impinging laser beam selectively depending on its wavelength. Although generally, the dichroic mirror 7 introduces laser beam (660 nm, 780 nm in wavelength) emitted from the light source 11 by transmitting all thereof while reflecting all laser beam (405 nm in wavelength) emitted from the light source 12 to introduce to the optical disk D, according to this embodiment, this dichroic mirror 7 is provided with a function as a monitor optical device of the present invention.

That is, according to this embodiment, the first region 31 for introducing part of laser beam emitted from the light sources 11, 21 to the monitor detector 5 and the second region 32 for introducing the remainder of the laser beam to the optical disk D are formed on the dichroic mirror 7. The shape and disposition of the first region 31 can be considered in the same way as the rise-up mirror 4 of the first embodiment shown in FIGS. 1, 5-8 and in the dichroic mirror 7 also, the first region 31 is formed at least within the second region 32.

Because according to this embodiment, the first region 31 and the second region 32 are formed in the dichroic mirror 7 not in the rise-up mirror 4, their function is different from that of the first embodiment 1. That is, the first region 31 of the dichroic mirror 7 has both a transmission function of transmitting part of the laser beam having a specific wavelength (for example, 660 nm, 780 nm) of laser beam emitted from the light sources 11, 21 and a reflection function of reflecting part of laser beam having other wavelength (for example, 405 nm) and introducing to the monitor detector 5.

Figure 13:
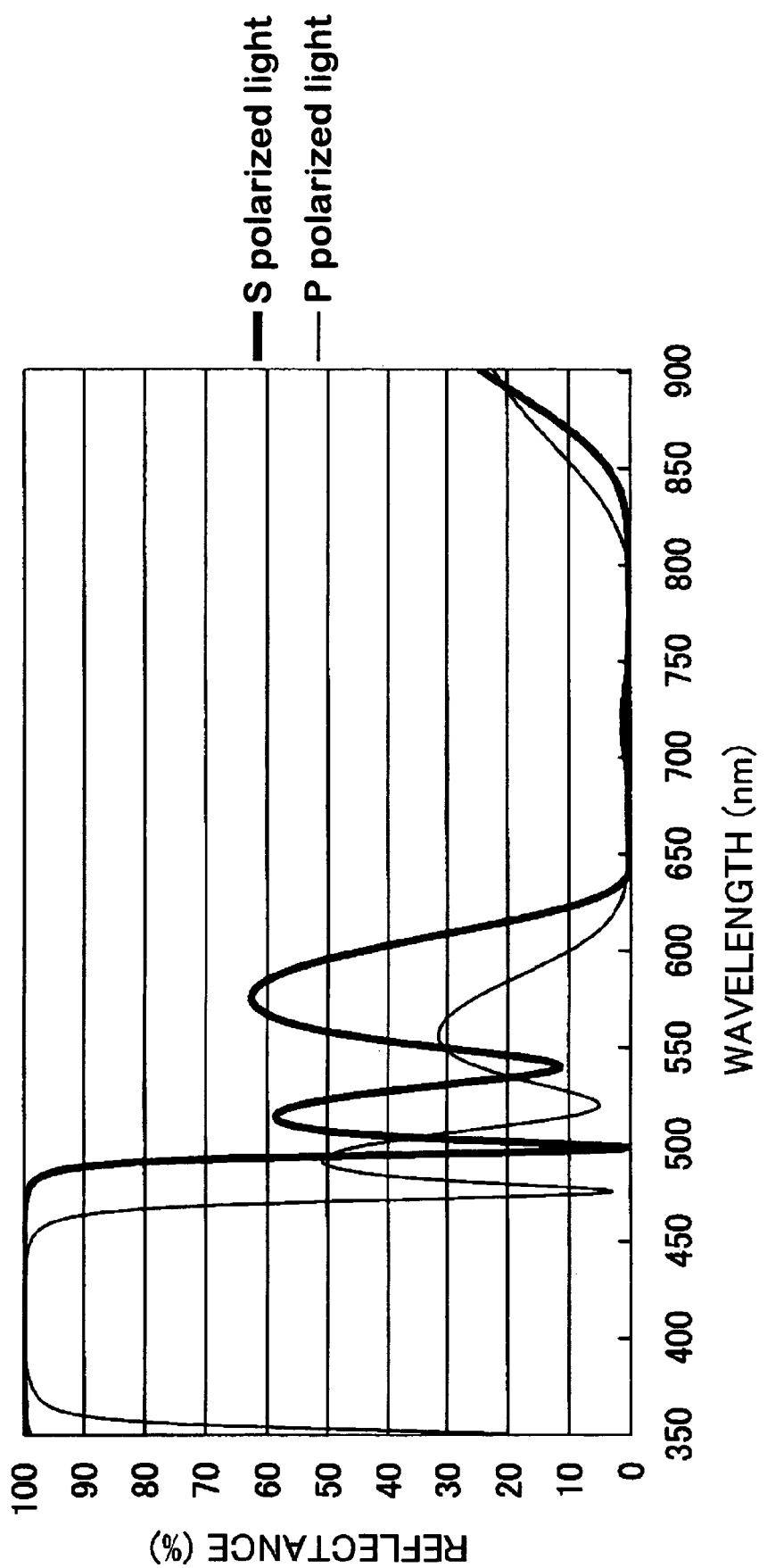
FIG. 13 is an explanatory diagram showing the spectral reflectance of the first region of a dichroic mirror used for the optical pickup.

FIG. 13 shows the spectral reflectance of the first region 31 in the dichroic mirror 7. In the first region 31, its reflectance in the vicinity of 660 nm, 780 nm in wavelength is 4% or less (transmissivity: 96% or more) and most laser beam having such wavelength passes through the first region 31. Further, the reflectance in the vicinity of 405 nm in wavelength in the first region 31 is as high as 96% or more and most laser beam having the wavelength of 405 nm is reflected by the first region 31.

On the other hand, the second region 32 has both a reflection function of reflecting remainder of laser beam having a specific wavelength (for example, 660 nm, 780 nm) to introduce to the optical disk D and a transmission function of transmitting remainder of laser beam having other wavelength (for example, 405 nm) to introduce to the optical disk D.

Figure 14:
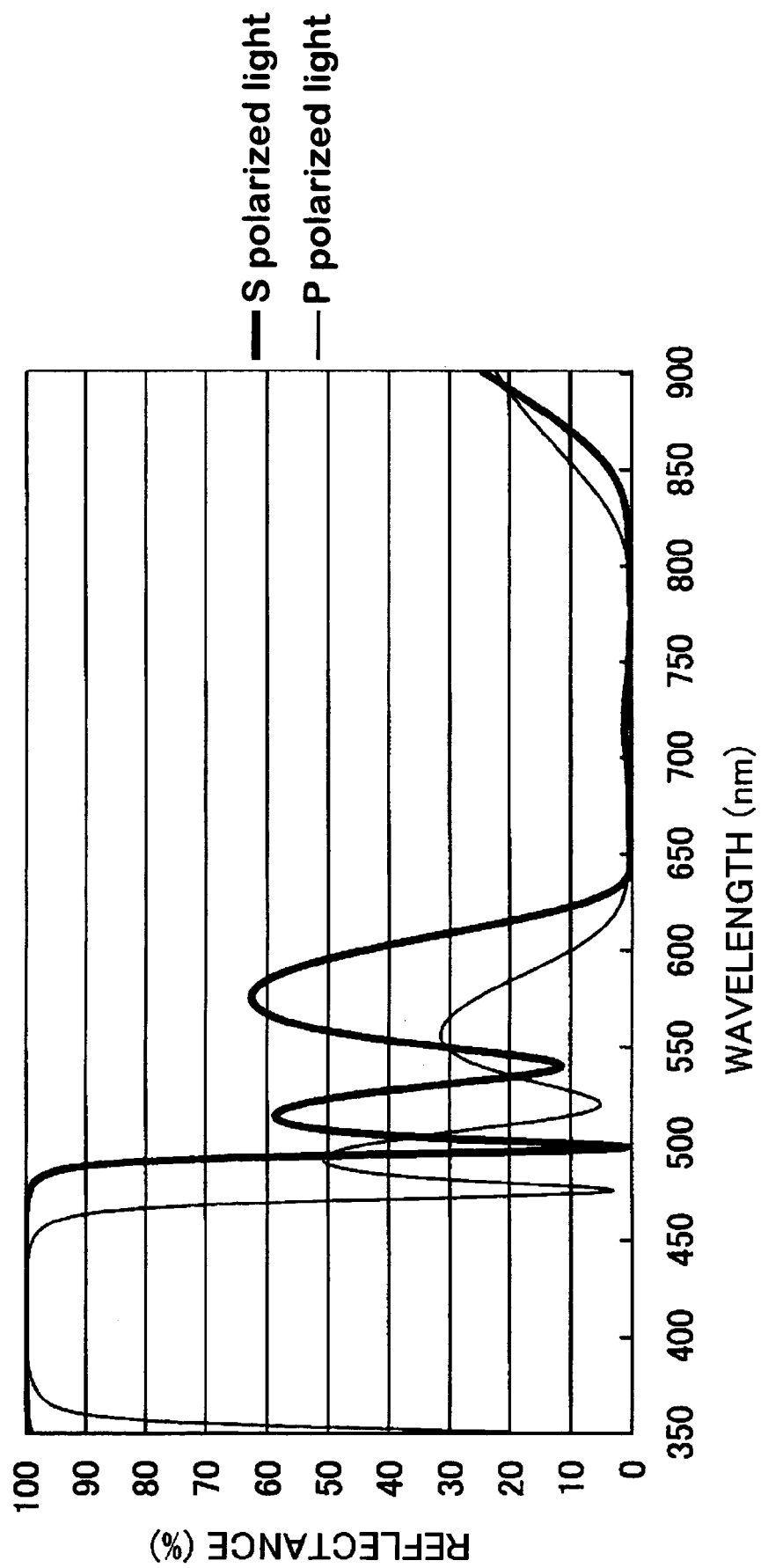
FIG. 14 is an explanatory diagram showing the spectral reflectance of the second region of the dichroic mirror.

FIG. 14 shows the spectral reflectance of the second region 32 in the dichroic mirror 7. In the second region 32, its reflectance in the vicinity of 660 nm, 780 nm in wavelength is as high as 96% or more and most laser beam having such a wavelength is reflected by the second region 32. Further, the reflectance in the vicinity of 405 nm in wavelength in the second region 32 is 4% or less (transmissivity: 96% or more) and most laser beam having the wavelength of 405 nm passes through the second region.

Under the above-described structure, the operation of the optical pickup of this embodiment is as follows. That is, of linearly polarized laser beam emitted from the light source 11, for example, P polarized light passes through the PBS 12 and impinges upon the collimator lens 13. Then, of laser beam made to parallel beam by the collimator lens 13, laser beam impinging upon the first region 31 of the dichroic mirror 7 is reflected by the dichroic mirror 7 and introduced to the monitor detector 5, in which it is monitored. On the other hand, of the linearly polarized laser beam emitted from the light source 21, for example, P polarized beam passes through the PBS 22 and impinges upon the collimator lens 23. Then, of laser beam made to parallel beam by the collimator lens 23, laser beam impinging upon the first region 31 of the dichroic mirror 7 passes through the dichroic mirror 7 and is introduced to the monitor detector 5, in which it is monitored.

On the other hand, of laser beam emitted from the light source 11, laser beam impinging upon the second region 32 in the dichroic mirror 7 passes through the dichroic mirror 7 and impinges upon the rise-up mirror 4. Of laser beam emitted from the light source 21, laser beam impinging upon the second region 32 in the dichroic mirror 7 is reflected by the dichroic mirror 7 and impinges upon the rise-up mirror 4. The laser beam impinging upon the rise-up mirror 4 is reflected toward the optical disk D and after circularly polarized by the ¼ wavelength plate 8, focused on the optical disk D by the objective lens 6.

Return light from the optical disk D impinges upon the ¼ wavelength plate 8 through the objective lens 6 and after linearly polarized (for example, S polarized light) here, is reflected by the rise-up mirror 4 and then impinges upon the dichroic mirror 7. If the return light is return light of laser beam emitted from the light source 11 at this time, the return light impinging upon the dichroic mirror 7 passes through the dichroic mirror 7 and impinges upon the PBS 12 through the collimator lens 13. In the PBS 12, the impinging return light is reflected and received by the light receiving device 14. On the other hand, if the return light is return light of laser beam emitted from the light source 21, the return light impinging upon the dichroic mirror 7 is reflected by the dichroic mirror 7 and impinges upon the PBS 22 through the collimator lens 23. In the PBS 22, the impinging return light is reflected and received by the light receiving device 24.

The dichroic mirror 7 having the first region 31 and the second region 32 mentioned above can be manufactured in the same way as the rise-up mirror 4 of the first embodiment described with reference to FIGS. 9A-9J. To provide the first region 31 of the dichroic mirror 7 with both functions for transmission and reflection and the second region 32 with both functions for transmission and reflection, it is necessary to form both the dielectric multi-layer film 47 corresponding to the first region 31 and the dielectric multi-layer film 44 corresponding to the second region 32 on the glass substrate 41. Therefore, according to this embodiment, all steps in FIGS. 9A to 9J need to be executed. In the step of FIG. 9D, the dielectric multi-layer film 44 having the characteristic of FIG. 14 is used and in the step of FIG. 9I, the dielectric multi-layer film 47 having the characteristic of FIG. 13 is used.

As described above, the dichroic mirror 7 of this embodiment has the first region 31 for introducing part of laser beam emitted from the light sources 11, 21 to the monitor detector 5 and the second region 32 for introducing the remainder of the laser beam to the optical disk D like the rise-up mirror of the first embodiment and the first region 31 is formed at least within the second region 32. As a consequence, even if laser beam is spread due to changes in power of the light sources 11, 21 or the like, the monitor beam can be obtained in the first region 31 formed at least within the second region 32 without being influenced thereby. As a result, the light quantity can be controlled appropriately based on monitor beam obtained through the first region 31.

Further, because the first region 31 and the second region 32 are formed each with a predetermined area, even if the wavelength of impinging laser beam fluctuates due to changes in temperature or the like, incident beam can be separated between the first region 31 and the second region 32 without being influenced thereby as long as the laser beam impinges upon the first region 31 and the second region 32. Thus, even if the wavelength fluctuates due to changes in temperature or the like, the light quantity can be controlled appropriately based on the monitor light obtained through the first region 31.

Further, even if no special optical device for picking out monitor light is provided, by forming the first region 31 and the second region 32 having the characteristic shown in FIGS. 13, 14 in an existing dichroic mirror 7, a monitor optical device can be achieved easily with the dichroic mirror 7. Therefore, even if plural light sources are provided corresponding to different wavelengths, the monitor optical device can be constituted of a single dichroic mirror 7, thereby avoiding complexity of the apparatus and increase in manufacturing cost.

In the meantime, the present invention can be expressed as follows.

The monitor optical device of the present invention is an optical device of monitor disposed on an optical path between a light source and an optical disk, which has a first region for introducing part of the light beam emitted from the light source to a monitor detector and a second region for introducing the remainder of the light beam to the optical disk. The first region and the second region are formed on the same plane of a substrate and each of them contains dielectric multi-layer films having different characteristic and the first region is formed at least within the second region.

Third Embodiment

Further other embodiment of the present invention will be described with reference to the accompanying drawings. According to this embodiment, the PBS is provided with a function as a monitor optical device. Herein after, the detail thereof will be described.

Figure 15:
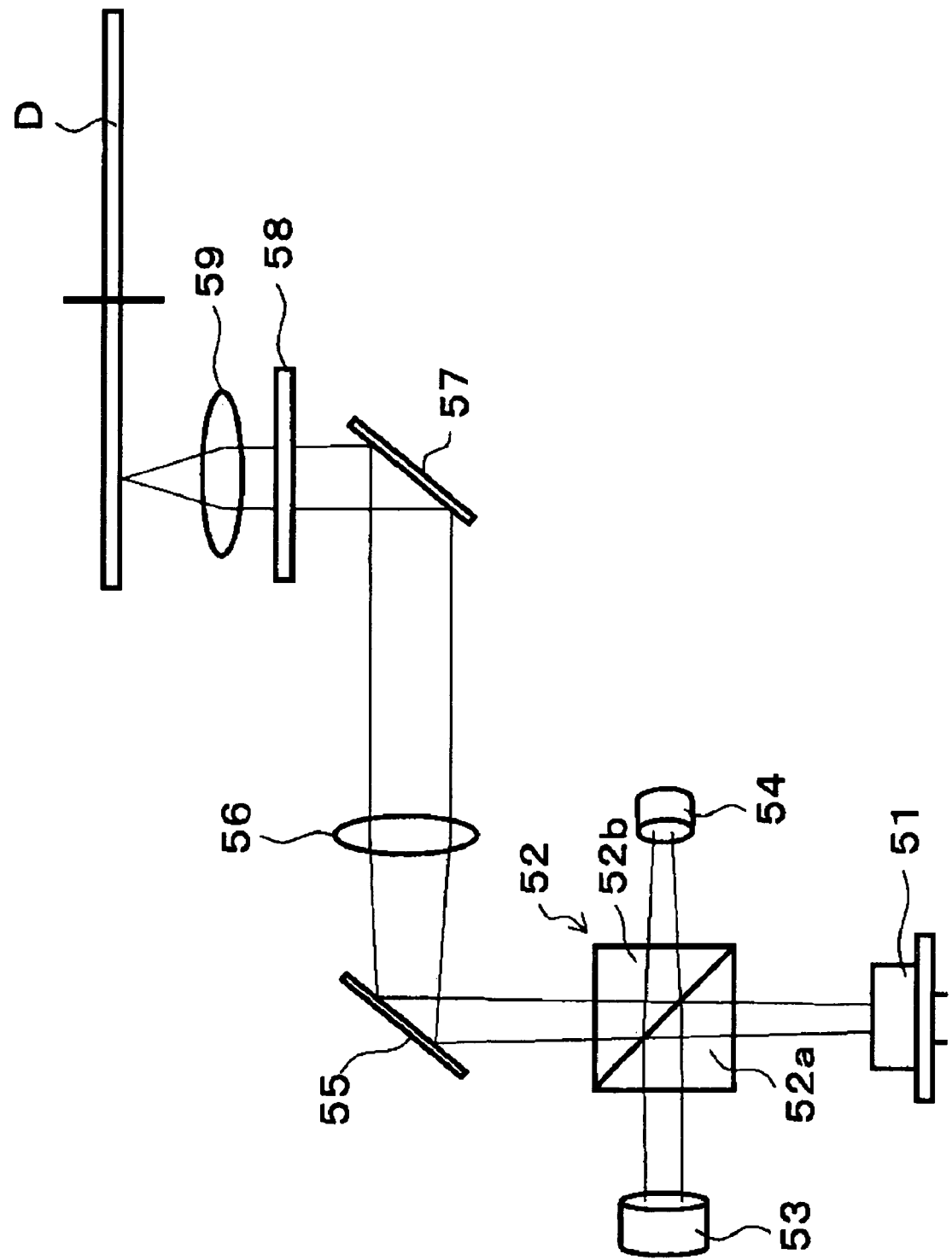
FIG. 15 is an explanatory diagram showing the structure of the optical pickup of other embodiment of the present invention.

FIG. 15 is an explanatory diagram schematically showing the structure of an optical pickup apparatus of this embodiment. The optical pickup apparatus of this embodiment comprises a light source 51, a PBS 52, a monitor detector 53, a light receiving device 54, a mirror 55, a collimator lens 56, a rise-up mirror 57, a ¼ wavelength plate 58 and an objective lens 59.

The light source 51 is a 2-wavelength 1-chip type light source for emitting laser beam (for example, 660 nm in wavelength) for DVD and laser beam (for example, 780 nm in wavelength) for CD as light beam. That is, two light emitting portion for emitting light beam are incorporated in a single package.

The PBS 52 is a polarization separating device for separating incident light depending on polarization state and has a characteristic which transmits for example, P polarized beam while reflecting S polarized beam. Such a PBS 52 is capable of transmitting one of polarized beam (for example P polarized beam) emitted from the light source 51 and introducing to the optical disk D and further introducing the other polarized beam (for example, S polarized beam) impinging upon the PBS 52 through the optical disk D to the light receiving device 54. In the meantime, the detail of the PBS 52 will be described below.

The monitor detector 53 receives (monitor) part of laser beam emitted from the light source 51 and is composed of for example, a photodiode. An output of laser beam emitted from the light source 51 is controlled by a control portion (not shown) based on the quantity of light received by the monitor detector 53. This embodiment adopts front monitor type because laser beam emitted forward (direction D of the optical disk) from the light source 51 is monitored by the monitor detector 53.

The light receiving device 54 detects a signal by receiving return light from the optical disk D on which laser beam impinges through the PBS 52. That is, by receiving light with the light receiving device 54, servo signal (focus error signal, tracking error signal), information signal, aberration signal and the like are detected.

The mirror 55 reflects laser beam emitted from the PBS 52 and bends its optical path toward the collimator lens 56. The collimator lens 56 makes laser beam reflected by the mirror 55 to parallel beam.

The rise-up mirror 57 reflects laser beam emitted from the collimator lens 56 and bends its optical path to the optical disk D. The ¼ wavelength plate 58 converts impinging linearly polarized laser beam to circularly polarized beam. The objective lens 59 focuses laser beam impinging through the ¼ wavelength plate 58 on the optical disk D.

With the above-described structure, the linearly polarized laser beam (for example, P polarized beam) emitted from the light source 51 impinges upon the PBS 52 and passing through the second region 72 described later (see FIG. 16) in the PBS 52, impinges upon the mirror 55. Then, laser beam impinging upon the mirror 55 is converted to parallel beam by the collimator lens 56 and after reflected by the rise-up mirror 57, it impinges upon the ¼ wavelength plate 58. In the ¼ wavelength plate 58, the impinging linearly polarized laser beam is converted to circularly polarized beam and focused on the optical disk D through the objective lens 59.

On the other hand, of laser beam emitted from the light source 51, laser beam impinging upon the first region 71 described later (see FIG. 16) in the PBS 52 is reflected by the first region 71, and impinges upon the monitor detector 53 so that it is monitored by the monitor detector 53.

After return light from the optical disk D impinges upon the ¼ wavelength plate 58 through the objective lens 59 and is converted to linearly polarized beam (for example, S polarized beam), it impinges upon the rise-up mirror 57. After reflected by the rise-up mirror 57, it impinges on the PBS 52 through the collimator lens 56 and the reflection mirror 55 successively. In the PBS 52, the return light is reflected and received by the light receiving device 54.

Next the detail of the PBS 52 will be described.

As shown in FIG. 15, the PBS 52 is a cube prism constructed by bonding together two prisms having a triangular section such that their inclined faces oppose each other. According to this embodiment, the two prisms are a rectangular prism having a rectangular equilateral triangular section. Hereinafter, it is assumed that one of the two prisms is called first prism 52a while the other one is called second prism 52b. In the meantime, the inclined face mentioned above refers to a rectangular face having the longest side (slant side) of a sectional triangle of respective sides of a prism, as a side.

Figure 16:
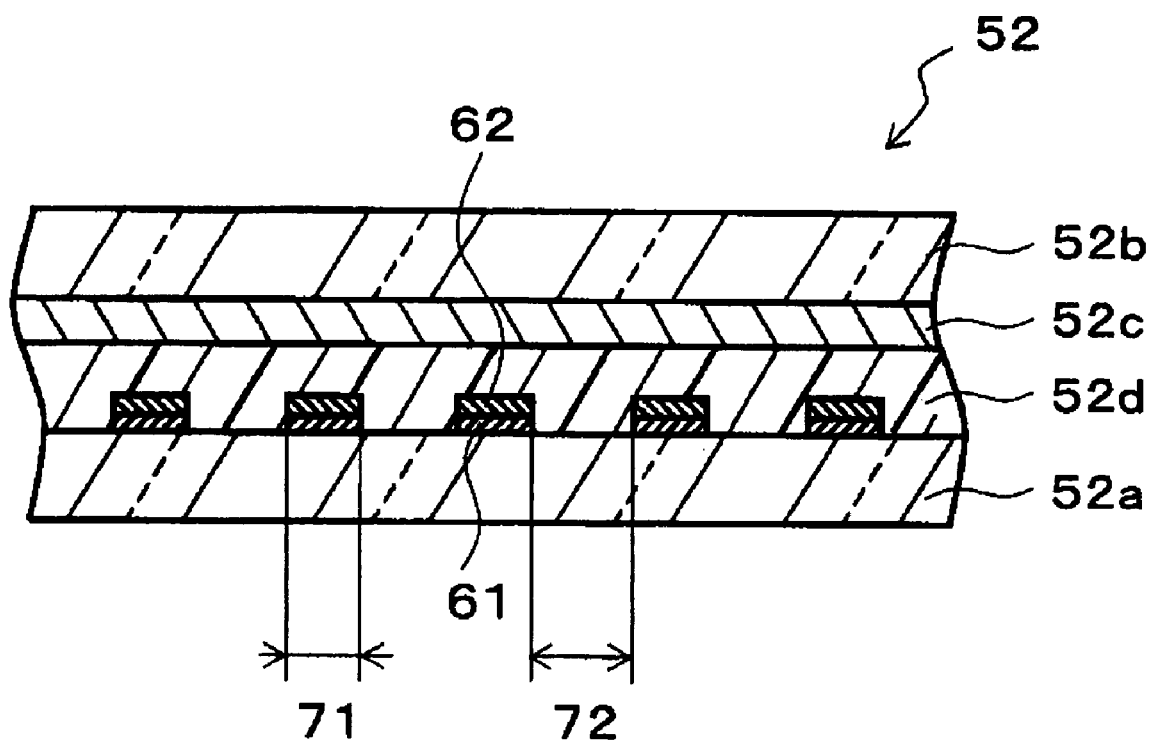
FIG. 16 is a sectional view showing the detailed structure of the PBS (Polarizing Beam Splitter) used for the optical pickup.

FIG. 16 is a sectional view showing the detailed structure of the PBS 52. On the inclined face of the first prism 52a, dielectric film 61 and metallic film 62 are layered on the substrate side and these are patterned. On the other hand, on the inclined face of the second prism 52b, polarization separation film 52c is formed. The first prism 52a and the second prism 52b are bonded through adhesive agent 52d such that the inclined faces oppose each other.

The detail of the second prism 52b on which light impinges ahead of the first prism 52a will be described. The polarization separation film 52c formed on the inclined face of the second prism 52b has a characteristic which transmits or reflects incident light depending on its polarization state and is constituted of for example, dielectric multi-layer film. If P polarized beam impinges upon the polarization separation film 52c by forming this polarization separation film 52c, the P polarized beam passes through for example the polarization separation film 52c and if the S polarized beam impinges upon the polarization separation film 52c, the S polarized beam is reflected by for example the polarization separation film 52c.

The dielectric multi-layer film constituting the polarization separation film 52c is constituted by setting material of the dielectric material having high refractivity, low refractivity and intermediate refractivity and the number of layers appropriately in order to obtain a desired characteristic (the above-mentioned optical characteristic). As the dielectric material having a high refractivity, for example, mixed oxides of $Ta_2O_5$, $TiO_2$, $Nb_2O_5$ and La, and Ti and La are available. As dielectric material having intermediate refractivity, for example, mixed oxide of $Al_2O_3$, Al and La is available. As dielectric material having a low refractivity, for example, $SiO_2$, and $MgF_2$ are available.

Next, the detail of the first prism 52a will be described. A region in which dielectric film 61 and metallic film 62 are formed on the inclined face of the first prism 52a is a reflection region which reflects part of laser beam emitted from the light source 51 to introduce to the monitor detector 53, and this region constitutes a first region 71 for introducing part of light beam emitted from the light source 51 to the monitor detector 53. On the other hand, a region on which light flux from the light source 51 impinges, located on the inclined face of the first prism 52a and in which no dielectric film 61 or metallic film 62 is formed is a transmission region for transmitting the remainder of laser beam emitted from the light source 51 to introduce to the optical disk D, thereby forming a second region 72 for introducing the remainder of light beam emitted from the light source 51 to the optical disk D.

According to this embodiment, the shapes of the patterns of the dielectric film 61 and metallic film 62 constituting the first region 71 are equal to that of any of the patterns of the first region 31 of FIGS. 1, 5-8 of the first embodiment. Therefore, it can be said that the first region 71 is formed at least within (inside) the second region 72 like the first embodiment.

The metallic film 62 of the first region 71 is composed of any material of Al (reflectivity: about 85%), Cr (reflectivity: 60%) and Ag (reflectivity: 90%). These metallic materials can obtain almost flat reflectivity regardless of the wavelength of incident light. On the other hand, the dielectric film 61 is composed by selecting dielectric material constituting the polarization separation film 52c mentioned above and then stacking an appropriate number of the films.

With this structure of the PBS 52, light for DVD and CD emitted from the light source 51 impinges upon the first prism 52a and then impinges on the first region 71 or the second region 72 composed of the dielectric film 61 and the metallic film 62. Light impinging on the first region 71 is reflected by the first region 71 and impinges on the monitor detector 53, in which it is monitored. Light emitted from the light source 51 and impinging on the second region 72 passes through the second region 72 and the polarization separation film 52c and then goes toward the optical disk D. On the other hand, return light (S polarized beam) from the optical disk D passes through the second prism 52b and after that, impinges on the polarization separation film 52c, in which it is reflected and received by the light receiving device 54.

Because as described above, according to this embodiment also, the first region 71 is formed at least within (inside) the second region 72 in the PBS 52, even if laser beam is spread due to changes in power from the light source 51 or the like, monitor beam can be obtained in the first region 71 formed at least within the second region 72 without being influenced by these, so that appropriate control of light quantity can be carried out based on monitor light obtained through the first region 71. Thus the same effect as the first and second embodiments can be obtained.

Particularly, the PBS 52 of this embodiment has the same structure as an existing PBS except that the dielectric film 61 and the metallic film 62 are provided and by forming the dielectric film 61 and the metallic film 62, the first region 71 and the second region 72 can be formed easily in the PBS 52. Therefore, the monitor optical device of the present invention having the first region 71 and the second region 72 can be achieved easily by using the existing PBS.

As evident from the above-described operation, according to this embodiment, the respective prisms are bonded together and disposed on an optical path between the light source 51 and the optical disk D so that light from the light source 51 impinges upon the first prism 52a ahead of the second prism 52b. As a consequence, return light from the optical disk D, after passing through the second prism 52b, is reflected by the polarization separation film 52c so that it does not impinge on the adhesive agent 52d. Because if the return light passes through the adhesive agent 52d, its wave surface is disturbed, signal detection by the light receiving device 54 is disabled or deflection in phase occurs (linearly polarized beam is disturbed), thereby possibly sometimes generating loss in light quantity. Therefore, with the above-described structure, the above-mentioned inconvenience when the return light from the optical disk D passes the adhesive agent 52d can be avoided. However, the above-mentioned structure is not always necessary but it is permissible to form the metallic film 62 and the dielectric film 61 on the polarization separation film 52c.

By forming not only the metallic film 62 but also the dielectric film 61 on the inclined face of the first prism 52a, reflectivity of the metallic film 62 can be improved and as compared with formation of only the metallic film 62, light availability can be improved.

By forming the dielectric film 61, reflectivity of the first region 71 which is not changed depending on the wavelength of incident light by the metallic film 62 independently can be changed smoothly depending on the wavelength of incident light. As a consequence, monitor light quantity corresponding to the optical disk D can be obtained. For example, monitor light quantity which is about 15%±3% of the quantity of emitted light from the light source 51 can be obtained for DVD and monitor light quantity which is about 18%±3% of the quantity of emitted light from the light source 51 can be obtained for CD. Even if a light source for optical disk corresponding to blue laser is further mounted, the quantity of monitor light which is about 15%±3% of the quantity of emitted light from the light source 51 can be obtained. In the meantime, the deflection of ±3% indicates a range in which light can change depending on the specification of the optical pickup.

Figure 17:
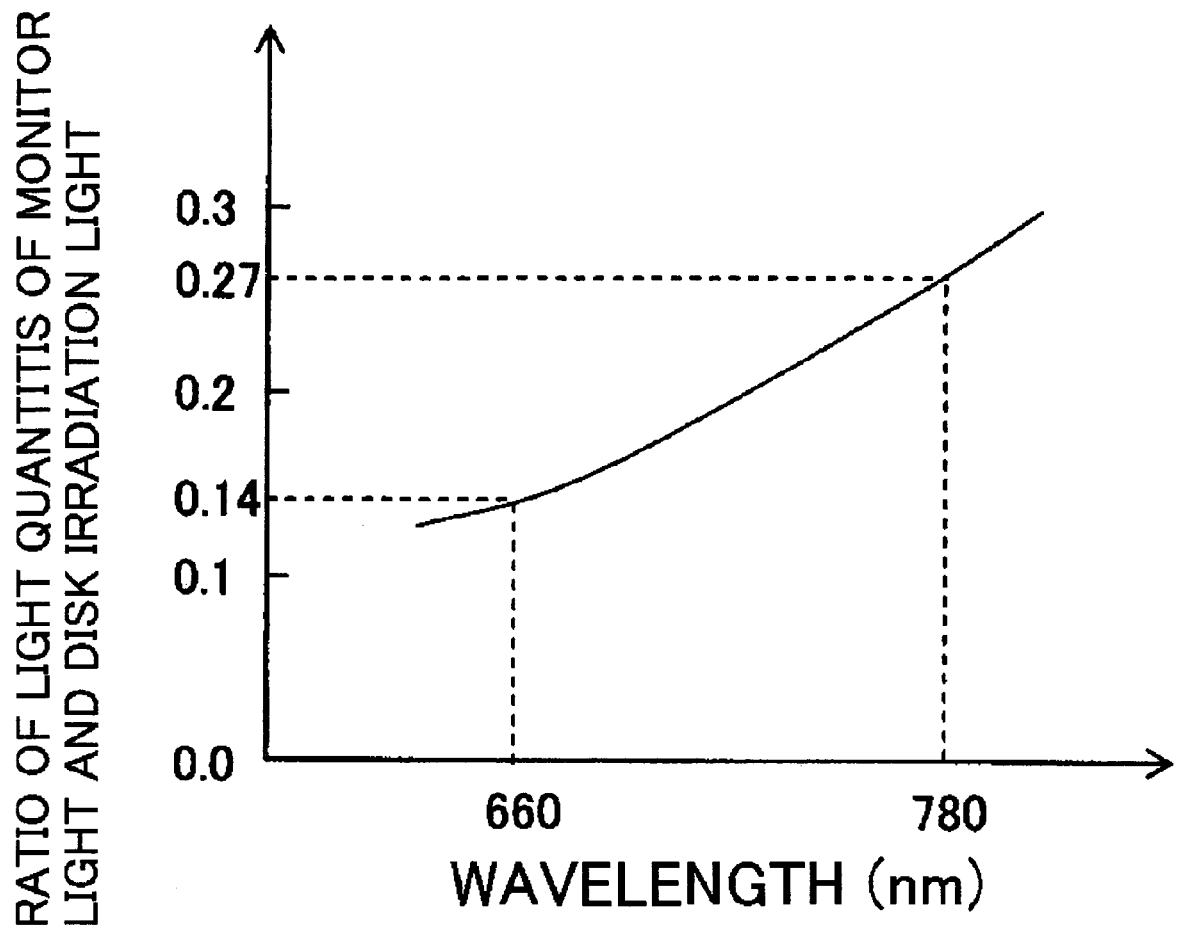
FIG. 17 is an explanatory diagram showing the relation between the wavelength of incident light and the ratio of light quantity of monitor light and disk irradiation light.

FIG. 17 is a graph showing the relation between the wavelength of incident light and the ratio of light quantity of the monitor light and disk irradiation light. If monitor light quantity of 12% minimum is secured for DVD, the ratio of light quantity between the monitor light and disk irradiation light is 12/88=0.14. On the other hand, if monitor light quantity of 21% maximum is secured, the ratio of light quantity between the monitor light and disk irradiation light is 21/79=0.27. Because it is desired to secure the monitor light quantity of 12% minimum for DVD and secure the monitor light quantity of 21% maximum for CD, in order to obtain such monitor light quantity, the dielectric film 61 is constituted and reflectivity of the first region 71 is set up so that the ratio of light quantity is 0.14 to 0.27.

Although FIG. 17 indicates that the ratio of light quantity is 0.14 when the wavelength is 660 nm and the ratio of light quantity is 0.27 when the wavelength is 780 nm, the wavelength of laser beam for DVD changes in a range of 660 nm±30 nm and the wavelength of laser beam for CD changes in a range of 780±30 nm, the purpose is achieved if the ratio of light quantity of 0.14 can be obtained for DVD and the ratio of light quantity of 0.27 can be obtained for CD.

In the meantime, the monitor light quantity can change regardless of the wavelength of incident light by changing the area and density of the first region 71. Therefore, in order to change the monitor light quantity corresponding to the optical disk D for use, after the area and density of the first region 71 are specified appropriately, the dielectric film 61 (material and number of film layers) constituting the first region 71 is formed so that the reflectivity of the first region 71 changes corresponding to the wavelength of incident light from the light source 51.

Because if a bonding type PBS 52 is constructed by bonding the first prism 52a and the second prism 52b with the adhesive agent 52d as mentioned in this embodiment, no total reflection occurs on the inclined face of the first prism 52a, the incident angle (a sharp angle of angles formed by normal line and incident light) to the aforementioned inclined face can be 45°. Therefore, the first prism 52a and the second prism 52b can be constructed with a right angle prism so as to facilitate the construction (bonding).

Figure 18:
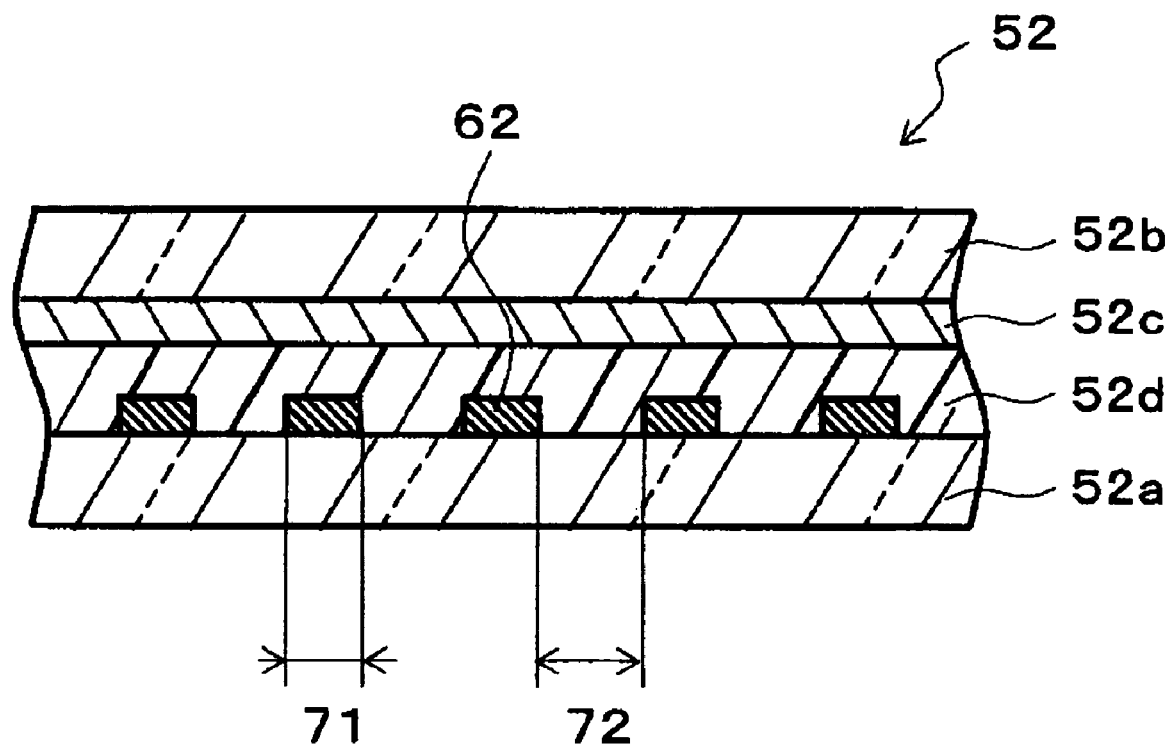
FIG. 18 is a sectional view showing other structure of the PBS.
Figure 19A:
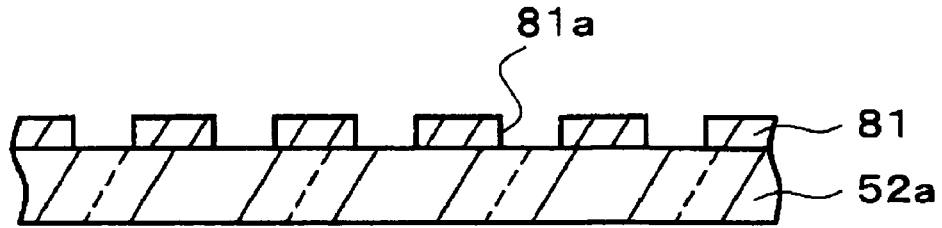
FIGS. 19A-19D are sectional views showing the manufacturing steps of the PBS manufactured according to masking method.
Figure 19B:
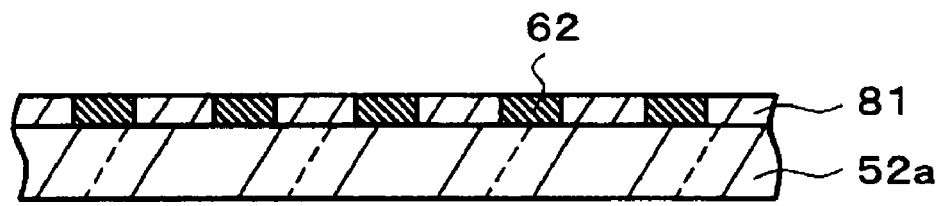
Figure 19C:
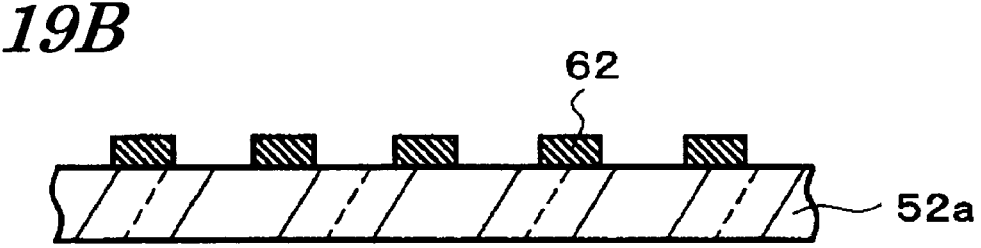
Figure 19D:
Figure 19D:
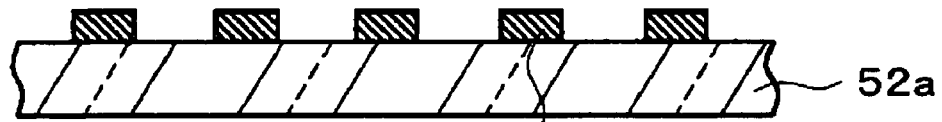

Although an example that the first region 71 is constituted of the dielectric film 61 and the metallic film 62 has been described above, the first region 71 may be constituted of only the metallic film 62. For example, FIG. 18 is a sectional view showing other structure of the PBS 52. In this PBS 52, the metallic film 62 is formed directly on the inclined face of the first prism 52a and by patterning this, the first region 71 is formed. If the aforementioned quantity of monitor light (or the aforementioned ratio of light quantity) is not required to be changed depending on the wavelength of incident light, the first region 71 may be constituted of only the metallic film 62.

By the way, the metallic film 62 can be formed according to mask method or screen print method. The manufacturing method of the PBS 52 using these methods will be described.

FIGS. 19A-19D are sectional views showing the manufacturing steps of the PBS 52 to be manufactured using the mask method. A mask 81 in which an opening 81a is formed according to a predetermined pattern is mounted on the inclined face of the first prism 52a (first transparent substrate) (see FIG. 19A). The metallic film 62 is formed on the inclined face of the first prism 52a through an opening portion 81a in the mask 81 (see FIG. 19B). After that, by removing the mask 81, the first region 71 which is a formation region of the metallic film 62 and the second region 72 which is a non-formation region of the metallic film 62 are formed on the first prism 52a (see FIG. 19C).

Next, the polarization separation film 52c is formed on the inclined face of the second prism 52b (second transparent substrate) and the first prism 52a and the second prism 52b are located so that the metallic film 62 and the polarization separation film 52c oppose each other (see FIG. 19D) and these are bonded together with adhesive agent (not shown). Consequently, the PBS 52 shown in FIG. 18 is completed.

If the dielectric film 61 is formed on the first prism 52a, the dielectric film 61 is formed on the first prism 52a through the opening portion 81a in the mask 81 first and then, the metallic film 62 is formed through the same opening portion 81a.

On the other hand, FIGS. 20A-20F are sectional views showing the manufacturing steps of the PBS 52 to be manufactured using the screen print method. First, a screen 91 in which an opening portion 91a is formed according to a predetermined pattern is prepared (see FIG. 20A) and the metallic material 62a (material of the metallic film 62) is applied on the screen 91 (see FIG. 20B). Then, the screen 91 is approached to the inclined face of the first prism 52a (see FIG. 20C) and the metallic material 62a is applied onto the first prism 52a through the opening portion 91a using a spatula (see FIG. 20D). After that, the screen 91 is removed from the first prism 52a (see FIG. 20E). As a consequence, the first region 71 which is film formation region (formation region of the metallic film 62) of the metallic material 62a and the second region 72 which is non-film formation region of the metallic material 62a are formed on the first prism 52a.

Figure 20A:
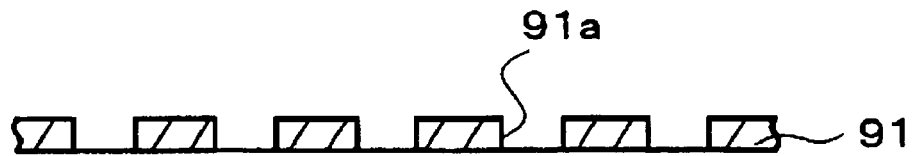
FIGS. 20A-20F are sectional views showing the manufacturing steps of the PBS manufactured according to screen printing method.
Figure 20B:
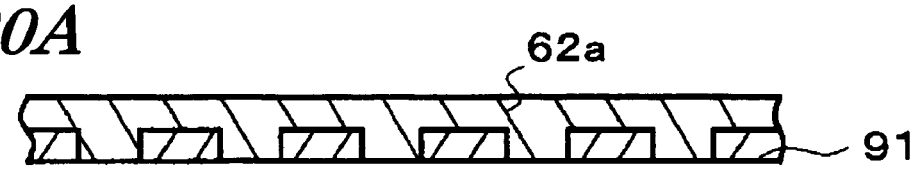
Figure 20C:
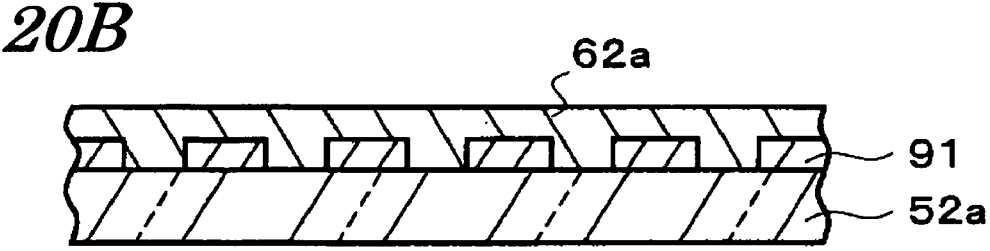
Figure 20D:
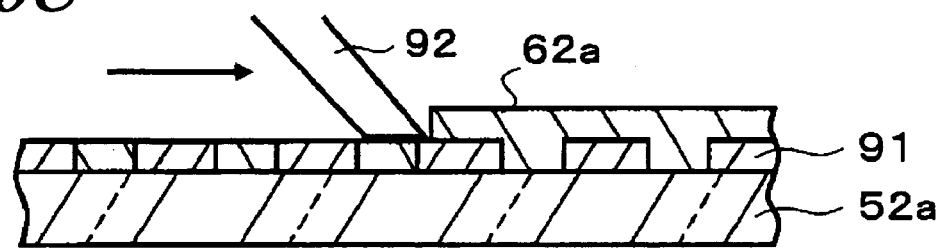
Figure 20E:
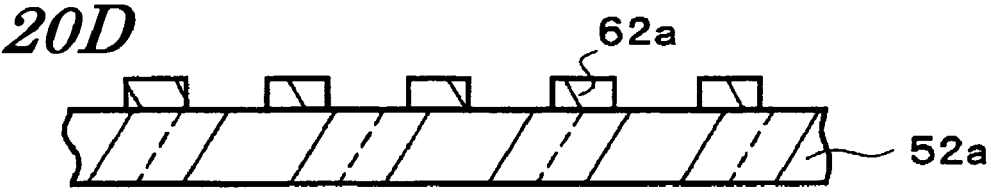
Figure 20F:
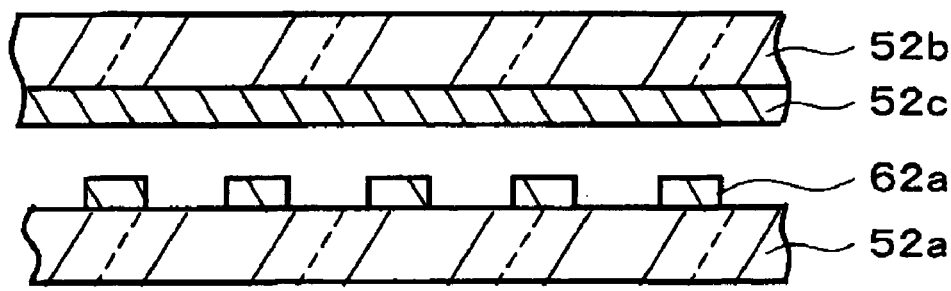

After that, like in case of the mask method, the polarization separation film 52c is formed on the second prism 52b and the first prism 52a and the second prism 52b are bonded together with adhesive agent (not shown) so that the metallic material 62a and the polarization separation film 52c oppose each other (see FIG. 20F). As a consequence, the PBS 52 shown in FIG. 18 is completed.

The metallic film 62 (metallic material 62a) can be formed on the first prism 52a using the mask method or the screen method and the first region 71 and the second region 72 can be formed easily. Therefore, according to these methods, the PBS 52 of this embodiment can be achieved easily.

When forming the dielectric film 61 on the first prism 52a, the dielectric film 61 is formed on the first prism 52a according to vacuum deposition method or the like and after that, the metallic film 62 is formed according to the screen print method. In this case, the dielectric film 61 may be formed in the same pattern as the metallic film 62 or may be formed on the first prism 52a without patterning.

Fourth Embodiment

Still other embodiment of the present invention will be described with reference to the accompanying drawings. Although in the second embodiment, an example that the monitor optical device is constituted of a bonding type PBS has been described, according to this embodiment, an example that the monitor optical device is constituted of air-gap type PBS will be described. In the meantime, like reference numerals are attached to the same components and description thereof is omitted.

Figure 21:
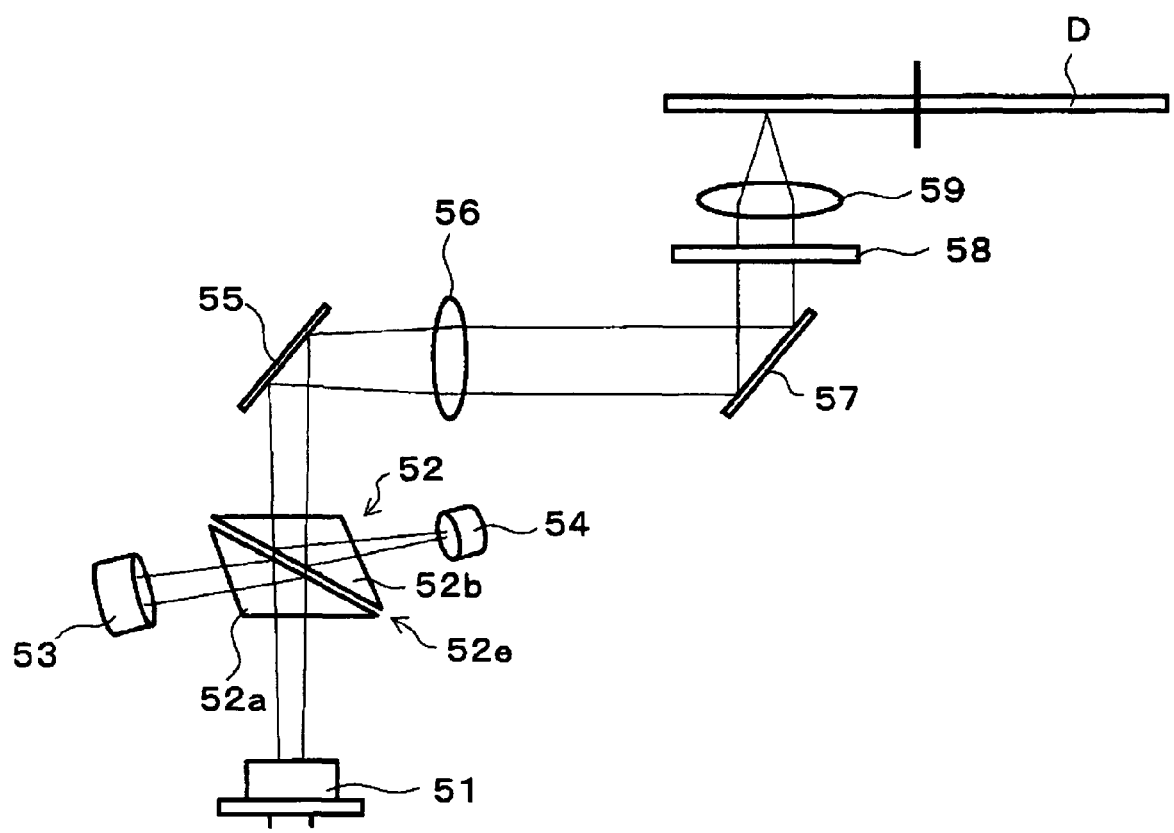
FIG. 21 is an explanatory diagram showing the structure of the optical pickup of still other embodiment of the present invention.
Figure 22:
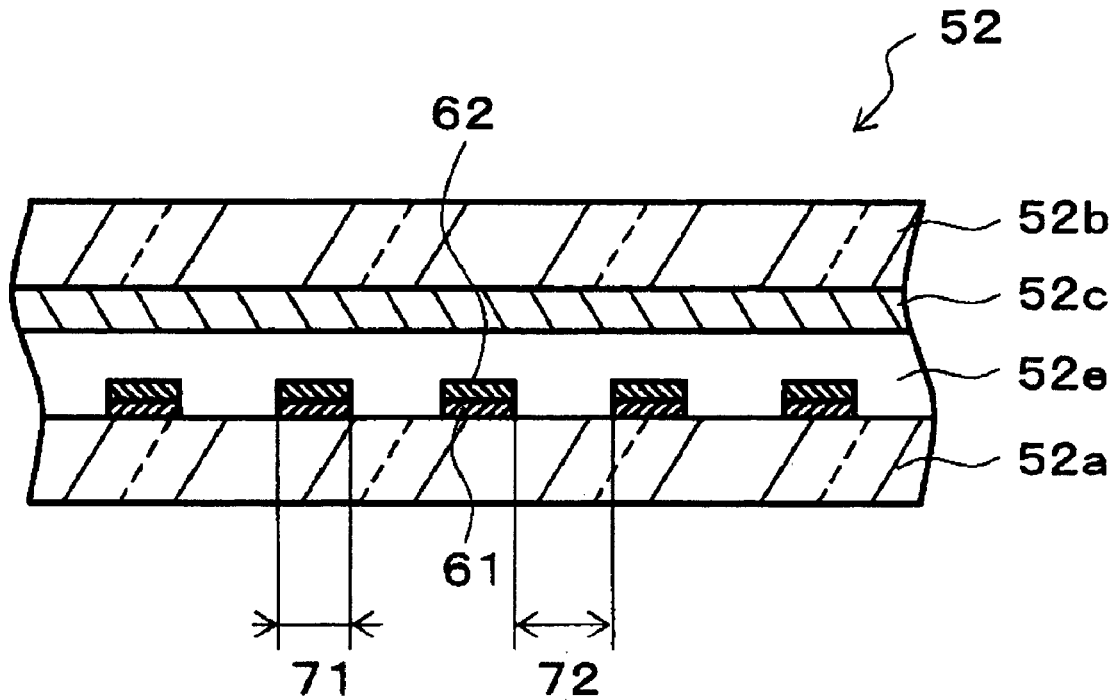
FIG. 22 is a sectional view showing the detailed structure of the PBS for use in the optical pickup.

FIG. 21 is an explanatory diagram showing the structure of an optical pickup apparatus of this embodiment. FIG. 22 is a sectional view showing the structure of the PBS 52 of this embodiment. According to this embodiment, the first prism 52a and the second prism 52b of the PBS 52 are bonded together via an air gap of about 5-10 μm. The dielectric film 61 and the metallic film 62 are layered on the inclined face of the first prism 52a and the polarization separation film 52a is formed on the inclined face of the second prism 52b. A region in which the dielectric film 61 and the metallic film 62 are layered constitutes the first region 71. Other region than the first region 71 within a region on which beam flux from the light source impinges constitutes the second region 72.

According to this embodiment, the PBS 52 is entirely a rhombus-shaped prism and the sectional shape of the first prism 52a and the second prism 52b constituting the PBS 52 is of triangle whose one internal angle is obtuse angle, collapsing from the rectangular equilateral triangle.

Because the air-gap type PBS 52 of this embodiment has the same structure as the bonding type PBS 52 except that no adhesive agent exists between the first prism 52a and the second prism 52b, the same effect as the third embodiment can be obtained using the air-gap type PBS 52. Further, because the aforementioned adhesive agent does not exist in the air-gap type PBS 52, a problem occurring when return light from the optical disk D passes through adhesive agent (disturbance of wave surface and deviation in phase) does not need to be considered. Therefore, it is not necessary to dispose the first prism 52a on the side of the light source 51 and the second prism 52b on the side of the optical disk D unlike the third embodiment, so that freedom of disposition of the first prism 52a and the second prism 52b is increased.

However, unless the incident angle is set appropriately in the air-gap type PBS 52, total reflection occurs on the inclined face of the prism on the side of the light source 51, so that no light reaches the optical disk D. Then, according to this embodiment, if the incident angle, that is, an angle between the incident light from the light source 51 and the normal line to the inclined face of the first prism 52a is assumed to be $\theta(0°<\theta<90°)$, the PBS 52 which satisfies $\theta<35°$ is constructed, and this is disposed on an optical path between light source 51 and the optical disk D. This is a result of considering that critical angle in which total reflection occurs on the inclined face of the first prism 52a is 41° and opening angle (angle formed by beams on the outermost sides) of light emitted from the light source 51 is about 6°. That is, if the incident angle is smaller than 35° which is a result of subtraction between them, an event that light from the light source 51 is totally reflected by the inclined face so that it is not irradiated on the optical disk D can be avoided.

Figure 23:
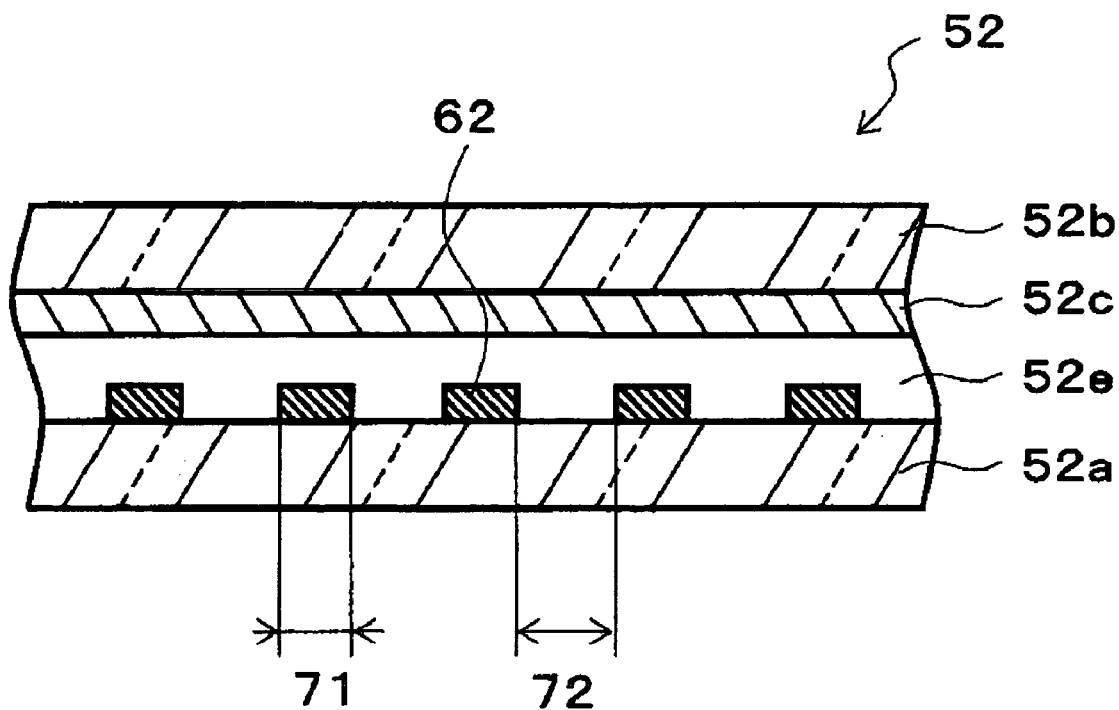
FIG. 23 is a sectional view showing other structure of the PBS.

FIG. 23 is a sectional view showing other structure of the air-gap type PBS 52. Needless to say, it is permissible to construct the air gap type PBS 52 by forming only the metallic film 62 without forming the dielectric film 61 on the first prism 52a.

When manufacturing the air gap type PBS 52 of this embodiment, the manufacturing method of the third embodiment can be applied except that two kinds of prisms are bonded together with adhesive agent.

Fifth Embodiment

Still other embodiment of the present invention will be described with reference to the accompanying drawings. According to this embodiment, an example that a monitor type optical device is constructed of a hole pattern type PBS will be described. Like reference numerals are attached to the same components as the third and fourth embodiments and description thereof is omitted.

Figure 24:
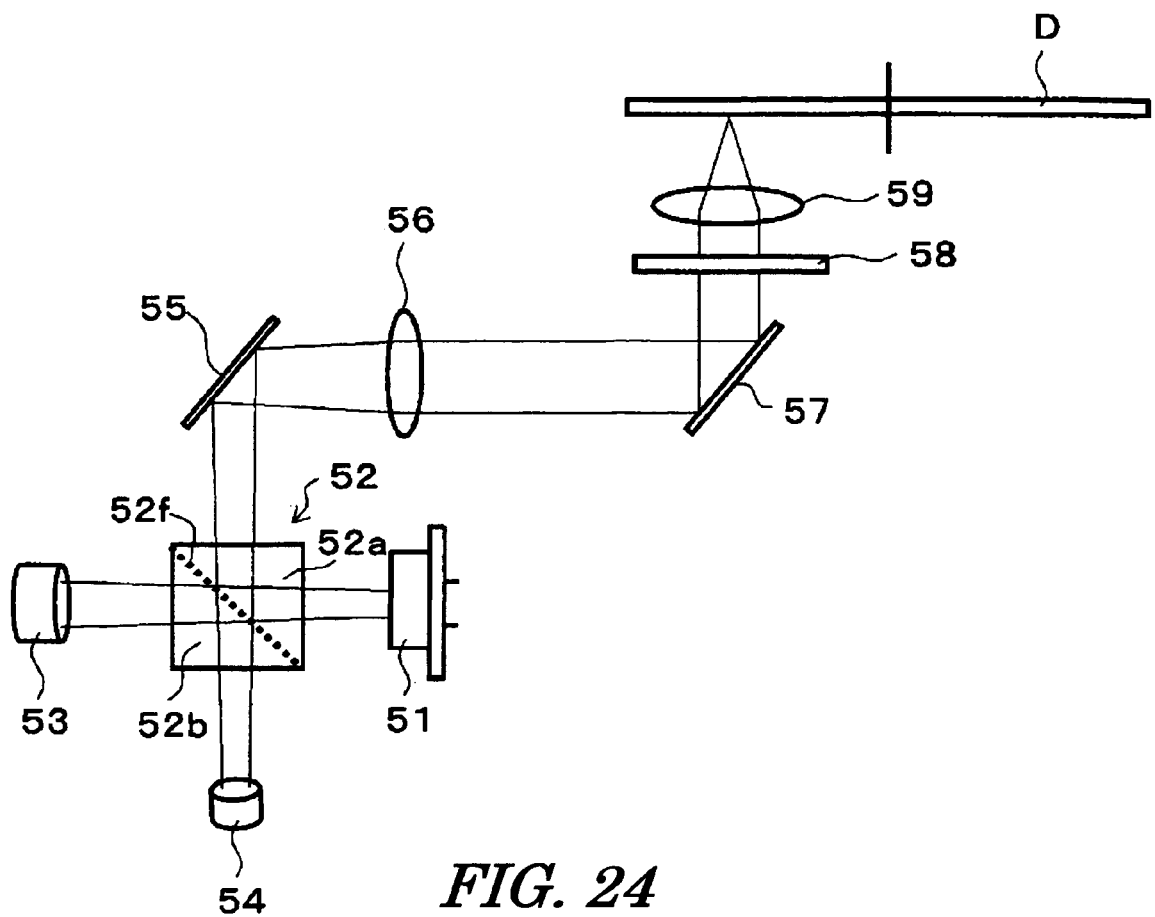
FIG. 24 is an explanatory diagram showing the structure of the optical pickup of still other embodiment of the present invention.
Figure 25:
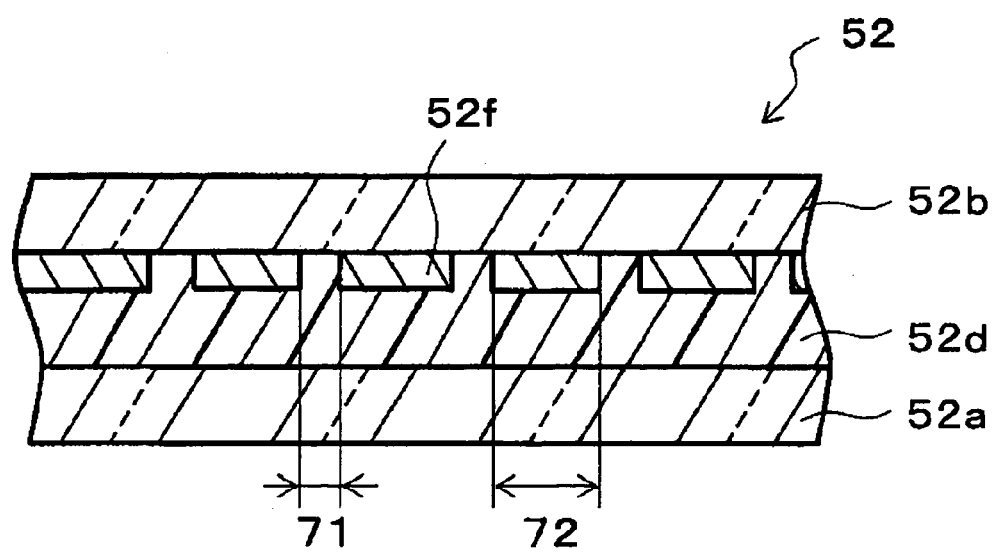
FIG. 25 is a sectional view showing the detailed structure of the PBS for use in the optical pickup.

FIG. 24 is an explanatory diagram showing the structure of an optical pickup apparatus of this embodiment. FIG. 25 is a sectional view showing the structure of the PBS 52 of this embodiment. According to this embodiment, the light source 51 is constructed to emit S polarized beam. Then, the dielectric film 61 and the metallic film 62 described about the third and fourth embodiments are not formed on the inclined face of the first prism 52a of the PBS 52 and the polarization separation film 52f is formed on the inclined face of the second prism 52b.

The polarization separation film 52f has characteristic of transmitting or reflecting incident light depending on polarization condition. Speaking more in detail, the polarization separation film 52f has characteristic of reflecting S polarized beam and transmitting P polarized beam. The polarization separation film 52f is formed by selecting dielectric material which constitutes the polarization separation film 52c of the third embodiment and the number of layers thereof appropriately.

The polarization separation film 52f is different from the polarization separation film 52c of the third and fourth embodiments in that pattern is formed on the inclined face of the second prism 52b. According to this embodiment, an area (opening portion) produced by opening the polarization separation film 52f is a first region 71 for introducing part of light beam emitted from the light source 51 to the monitor detector 53. On the other hand, a region in which the polarization separation film 52f exists within a region on which light flux impinges is a second region for introducing the remainder of the light beam to the optical disk D (by reflection). According to this embodiment, the first region 71 is a transmission region and the second region 72 is a reflection region. This is the same as the above-described embodiments in that the first region 71 is formed at least within the second region 72.

With this structure, light (S polarized beam) for DVD or CD emitted from the light source 51 impinges on the first prism 52a and then impinges on the first region 71 and the second region 72. The light impinging on the first region 71 passes through the first region 71 and then impinges on the monitor detector 53, in which it is monitored. Although the light emitted from the light source 51 and impinging upon the second region 72 is reflected by the second region 72 and advances toward the optical disk D, part of the remainder thereof passes through the second region 72 and impinges upon the monitor detector 53. On the other hand, return light (P polarized beam) from the optical disk D passes through the first prism 52a, the polarization separation film 52f and the second prism 52b in succession and is received by the light receiving device 54.

Because according to this embodiment, in the PBS 52, the first region 71 is formed at least within (inside) the second region 72, the same effect as the above-described embodiments can be obtained, for example, that appropriate control on the light quantity can be carried out based on the monitor light obtained through the first region 71.

The PBS 52 of this embodiment can be formed easily by patterning the polarization separation film of an existing PBS and further, the dielectric film 61 and the metallic film 62 used in the third and fourth embodiments are not required. Thus, the PBS 52, which is a monitor optical device of the present invention, can be realized easily using the existing PBS.

The PBS 52 of this embodiment can be formed using the lift-off method mentioned in the first embodiment. The hole pattern type PBS 52 can be manufactured through the steps of FIGS. 9A-9E. In FIGS. 9A-9E, the transparent substrate 41 corresponds to the second prism 52b and the dielectric multilayer film 44 corresponds to the polarization separation film 52c. That is, the hole pattern type PBS 52 can be manufactured as described above.

First, a sacrifice layer is formed on one transparent substrate (second prism 52b). The sacrifice layer is coated with resist and patterned. Next, the sacrifice layer is etched so that a pattern corresponding to the resist pattern is left. Subsequently, the polarization separation film is formed on the transparent substrate so as to cover the resist and left sacrifice layer. After that, the first region and the second region are formed by etching the sacrifice layer and the polarization separation film above it and removing it. Up to the above-described steps, the steps of FIGS. 9A-9E are completed. After that, the transparent substrate and the other transparent substrate (first prism 52a) are bonded together. Using the lift-off method enables the PBS 52 of this embodiment to be manufactured easily.

In the PBS 52 of this embodiment, another dielectric film may be formed in an opening portion of the polarization separation film 52f. If the PBS 52 is constructed in this way, the dielectric film can be provided with reflection characteristic to form the first region 71 and the polarization separation film 52f can be provided with transmission characteristic to form the second region 72. By disposing the light source 51, the monitor detector 53 and the light receiving device 54 at appropriate positions, light flux from the light source can be monitored by reflection.

Although an example that the light source 51 is constituted with a two-wavelength 1-chip light source has been described, the light source may be constituted of plural light sources for emitting a single wavelength. Alternatively, the light source 51 may be constituted by combining a light source for emitting a single wavelength and a light source for emitting plural wavelengths. If plural light sources are employed, by disposing a dichroic prism on an optical path between each light source and the PBS 52, laser beams emitted from the respective light sources can be synthesized prior to impinging on the PBS 52. Therefore, the light source 51 may be constituted of plural light sources which emit light beam of at least a wavelength or may be constituted of a single light source for emitting light beam having plural wavelengths.

According to the present invention, the monitor optical device having the first region and the second region can be achieved easily with an existing structure (rise-up mirror and wave multiplexer, PBS) of the optical pickup, so that the monitor light can be obtained without increasing the number of components thereby avoiding complexity of the apparatus and increase in manufacturing cost.

Even if the wavelength of light beam impinging on the monitor optical device changes due to fluctuation of the light source at the time of manufacturing or changes in temperature, light beam impinging on the first region can be used as monitor light regardless of changes in the wavelength. Even if the spreading of light beam changes due to changes in light source power or changes in temperature, the change in the quantity of light beam impinging on the inside of the second region is not as large as the change in the quantity of light beam impinging on the surrounding portion of the second region. Therefore, according to the present invention, despite fluctuation of light source, changes in temperature and changes in light source power, appropriate control on the light quantity can be carried out based on monitor light obtained through the first region.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical device disposed on optical path between a light source and an optical disk, comprising:
   a first region for introducing part of a light beam emitted from the light source to a monitor device;
   a second region for a introducing a remainder of the light beam to the optical disk;
   wherein the first region is formed as a plurality of spots within the second region; and
   wherein the plurality of spots constituting the first region are randomly disposed.

2. An optical pickup apparatus comprising:
   a light source for emitting a light beam;
   an optical device disposed on an optical path between the light source and an optical disk; and
   a monitor device for controlling an output of the light beam emitted from the light source,
   wherein the optical device comprises:
   a first region for introducing part of the light beam emitted from the light source to the monitor device;
   a second region for introducing a remainder of the light beam to the optical disk,
   wherein the first region is formed as a plurality of spots within the second region, and
   wherein the plurality of spots constituting the first region are randomly disposed.

3. An optical pickup apparatus as claimed in claim 2, wherein the first region transmits part of light beam emitted from the light source to introduce the transmitted light beam to the monitor device,
   the second region reflects the remainder of the light beam to introduce the reflected light beam to the optical disk.

4. An optical pickup apparatus as claimed in claim 3, wherein the shape of the optical device is a plane plate, and the optical device bends the optical path from the light source to the optical disk.

* * * * *